United States Patent [19]
Smith et al.

[11] Patent Number: 5,970,125
[45] Date of Patent: Oct. 19, 1999

[54] METHOD, SYSTEM AND APPARATUS FOR CAUSING CUSTOMER PREMISES EQUIPMENT TO AUTOMATICALLY CALL A TELECOMMUNICATIONS SERVER

[75] Inventors: Anthony Hamilton Smith, S.W. Calgary; Jacques Pierre LaPointe, N.W. Calgary; Kevin Peter Morris, New Brunswick, all of Canada

[73] Assignee: Nortel Networks Corporation, Montreal, Canada

[21] Appl. No.: 08/933,752

[22] Filed: Sep. 23, 1997

[51] Int. Cl.$^6$ .................................................. H04M 11/00
[52] U.S. Cl. ........................................ 379/93.25; 379/142
[58] Field of Search ............................... 379/90.01, 92.01, 379/92.03–93.08, 93.14, 93.17, 93.24–93.27, 100.08, 100.14–100.17, 142, 110.01, 354–357

[56] References Cited

U.S. PATENT DOCUMENTS

| | | | |
|---|---|---|---|
| 4,920,560 | 4/1990 | Kageyama | 379/100.14 |
| 4,935,954 | 6/1990 | Thompson et al. | 379/93.24 |
| 4,969,184 | 11/1990 | Gordon et al. | 379/100.13 |
| 5,262,860 | 11/1993 | Fitzpatrick et al. | 379/93.26 |
| 5,343,516 | 8/1994 | Callele et al. | 379/142 |
| 5,398,280 | 3/1995 | MacConnell | 379/93.24 |
| 5,416,831 | 5/1995 | Chewning, III et al. | 379/93.25 |
| 5,434,911 | 7/1995 | Gray et al. | 379/106.06 |
| 5,530,740 | 6/1996 | Irribarren et al. | 379/93.24 |
| 5,757,891 | 5/1998 | Wang | 379/93.24 |
| 5,768,528 | 6/1998 | Stumm | 379/93.24 |
| 5,832,067 | 11/1998 | Herold | 379/110.01 |

FOREIGN PATENT DOCUMENTS

WO95/04426  2/1995  WIPO .............................. 379/93.24

*Primary Examiner*—Wing F. Chan

[57] ABSTRACT

A system and method for providing messaging services at customer premises equipment. The system includes a messaging platform for receiving and storing messages, the messaging platform including a transmitter for receiving information request messages and a transmitter for transmitting information and customer premises equipment. The customer premises equipment includes a transmitter for transmitting an information request message from the CPE to the messaging platform and a receiver for receiving information from the messaging platform in response to the information request message.

30 Claims, 35 Drawing Sheets

| SIGNAL BYTE 1 | SIGNAL BYTE 2 | SIGNAL BYTE 3 | SIGNAL BYTE 4 | SIGNAL BYTE 5 | SIGNAL BYTE 6 | SIGNAL BYTE 7 | SIGNAL BYTE 8 | ... | SIGNAL BYTE 255 | FAMILY FUNCTION |
|---|---|---|---|---|---|---|---|---|---|---|
| STA PARAMETER | DATA LENGTH | APPLICATION NAME | | | | ACTION CODE | ACTION CODE DATA BYTE 1 | ... | ACTION CODE DATA BYTE 248 | |
| 151D | $XX | "Q" | "U" | "E" | "R" | $XX | $XX | ... | $XX | SPCS QUERIES CPE MODES |
| 151D | $XX | "F" | "O" | "N" | "E" | $XX | $XX | ... | $XX | SPCS CONTROLS CPE |
| 151D | $XX | "M" | "E" | "S" | "G" | $XX | $XX | ... | $XX | (1) SPCS AND CPE EXCHANGE MESSAGE DATA (2) SPCS MAINTAINS CPE'S CRC, IRN, AND MSR CONFIGURATION |
| 151D | $XX | "S" | "C" | "R" | "I" | $XX | $XX | ... | $XX | SPCS MAINTAINS CPE'S SCRIPTS |
| 151D | $XX | "P" | "O" | "L" | "L" | $XX | $XX | ... | $XX | SPCS MAINTAINS CPE'S MDP AND SPP CONFIGURATION |
| 151D | $XX | "R" | "E" | "M" | "I" | $XX | $XX | ... | $XX | SPCS MAINTAINS CPE'S CRC EVENTS |

Figure 2

SUBSET OF EXTENDED STA CODES BEGINNING WITH:
<151d> <STA SIGNAL LENGTH> <"Q"> <"U"> <"E"> <"R">

| ACTION CODE | OPERATION | DATA BYTE | DATA |
|---|---|---|---|
| $81 | QUERY: WHAT DIAL-UP MODE WILL BE USED? | | NULL |

Figure 3

SUBSET OF EXTENDED STA CODES BEGINNING WITH:
<151d> <STA SIGNAL LENGTH> <"F"> <"O"> <"N"> <"E">

| ACTION CODE | OPERATION | DATA BYTE | DATA |
|---|---|---|---|
| $01 | COMMAND: ISSUE DTMF "B" AND HANG UP LINE | NULL | |

Figure 4

| ACTION CODE | SUBSET OF EXTENDED STA CODES BEGINNING WITH: <151d> <STA SIGNAL LENGTH> <"M"> <"E"> <"S"> <"G"> | | |
|---|---|---|---|
| | OPERATION | DATA BYTE | DATA |
| $18 | | BYTES 1 - 12 | PRIMARY MESSAGE SENDING SERVER TELEPHONE # (BCD) |
| | | BYTE 13 | DELIMITER (BINARY) ($FF) |
| | | BYTES 14 - 25 | BACKUP MESSAGE SENDING SERVER TELEPHONE # (BCD) |
| | CONFIGURE | BYTE 26 | DELIMITER (BINARY) ($FF) |
| | IRN | BYTE 27 | NUMBER OF RETRIES (BINARY) |
| | CRC | BYTE 28 | DELAY BETWEEN RETRIES (BINARY) |
| | MSR | BYTES 29 - 89 | DISPLAY MESSAGE (ASCII) |
| | | BYTE 90 | DELIMITER (BINARY) ($FF) |
| | | BYTES 91 - 94 | CURRENT SECURITY CODE (BINARY) |
| | | BYTE 95 | DELIMITER (BINARY) ($FF) |
| | | BYTES 96 - 103 | NEW SECURITY CODE TWICE (OPTIONAL) |
| | | BYTE 104 | DELIMITER (BINARY) ($FF) |

Figure 5

SUBSET OF EXTENDED STA CODES BEGINNING WITH:
<151d> <STA SIGNAL LENGTH> <"S"> <"C"> <"R"> <"I">

| ACTION CODE | OPERATION | DATA BYTE | DATA |
|---|---|---|---|
| $01 | COMMENCE NON-INTERACTIVE FDM SESSION WITHIN CURRENT SDC SESSION | BYTES 1 - 4 | CPE - ID (BINARY) |
| $06 | CONFIGURE FSU | BYTES 1 - 4 | FDM NUMBER (BINARY) |
| | | BYTES 5 - 8 | SECURITY CODE (BINARY) |
| | | BYTES 9 - 12 | TIME TO CALL SERVER (BCD) (MM:DD:HH:MM) |
| | | BYTE 13 | DELIMITER (BINARY) ($FF) |
| | | BYTES 14 - 26 | PRIMARY FSU SERVER TELEPHONE # (BCD) |
| | | BYTE 27 | DELIMITER (BINARY) ($FF) |
| | | BYTES 28 - 39 | BACKUP FSU SERVER TELEPHONE # (BCD) |
| | | BYTE 40 | DELIMITER (BINARY) ($FF) |
| | | BYTE 41 | NUMBER OF RETRIES (BINARY) |
| | | BYTE 42 | DELAY BETWEEN RETRIES (BINARY) |
| | | BYTES 43 - 102 | DISPLAY MESSAGE (ASCII) |
| | | BYTE 103 | DELIMITER (BINARY) ($FF) |

Figure 6

| ACTION CODE | OPERATION | DATA BYTE | DATA |
|---|---|---|---|
| | | SUBSET OF EXTENDED STA CODES BEGINNING WITH: <151d> <STA SIGNAL LENGTH> <"P"> <"O"> <"L"> <"L"> | |
| $01 | CONFIGURE MDP | BYTES 1 - 12 | PRIMARY MESSAGING SERVER TELEPHONE # (BCD) — 130 |
| | | BYTE 13 | DELIMITER (BINARY) ($FF) — 132 |
| | | BYTES 14 - 25 | BACKUP MESSAGING SERVER TELEPHONE # (BCD) — 134 |
| | | BYTE 26 | DELIMITER (BINARY) ($FF) — 136 |
| | | BYTES 27 - 28 | POLL TIME 1 (BCD) (HH:MM) — 138 |
| | | BYTES 29 - 30 | POLL TIME 2 (BCD) (HH:MM) — 140 |
| | | BYTES 31 - 32 | POLL TIME 3 (BCD) (HH:MM) — 142 |
| | | BYTES 33 - 34 | POLL TIME 4 (BCD) (HH:MM) — 144 |
| | | BYTES 35 - 36 | POLL TIME 5 (BCD) (HH:MM) — 146 |
| | | BYTE 37 | DELIMITER (BINARY) ($FF) — 148 |
| | | BYTE 38 | NUMBER OF RETRIES (BINARY) — 150 |
| | | BYTE 39 | DELAY BETWEEN RETRIES (BINARY) — 152 |
| | | BYTES 40 - 99 | DISPLAY MESSAGE (ASCII) — 154 |
| | | BYTE 100 | DELIMITER (BINARY) ($FF) — 156 |
| $02 | CONFIGURE SPP | BYTES 1 - 12 | PRIMARY PAGE RESPONSE SERVER TELEPHONE # (BCD) — 160 |
| | | BYTE 13 | DELIMITER (BINARY) ($FF) — 162 |
| | | BYTES 14 - 25 | BACKUP PAGE RESPONSE SERVER TELEPHONE # (BCD) — 164 |
| | | BYTE 26 | DELIMITER (BINARY) ($FF) — 166 |
| | | BYTE 27 | DELAY BEFORE 1ST POLL (BINARY) — 168 |
| | | BYTE 28 | DELAY BETWEEN RETRIES (BINARY) — 170 |
| | | BYTE 29 | MAXIMUM NUMBER OF RETRIES (BINARY) — 172 |
| | | BYTES 30 - 89 | DISPLAY MESSAGE (ASCII) — 174 |
| | | BYTE 90 | DELIMITER (BINARY) ($FF) — 176 |

Figure 7

| ACTION CODE | | SUBSET OF EXTENDED STA CODES BEGINNING WITH: <151d> <STA SIGNAL LENGTH> <"R"> <"E"> <"M"> <"I"> | |
|---|---|---|---|
| | OPERATION | DATA BYTE | DATA |
| $01 | DOWNLOAD CRC EVENT | BYTES 1 - 4 | EVENT TIME (BCD) (MM:DD:HH:MM) |
| | | BYTES 5 - 8 | REMINDER TIME (BCD) (MM:DD:HH:MM) |
| | | BYTE 9 | REPEATING STATUS FLAG (BINARY) |
| | | BYTES 10 - 69 | DISPLAY MESSAGE (ASCII) |
| | | BYTE 70 | DELIMITER (BINARY) ($FF) |
| | | BYTES 71 - 82 | PAGER NUMBER RECEIVING REMINDER (BCD) |

Figure 8

| SEGMENT NAME | SEGMENT CHARACTERISTICS |
|---|---|
| PRIMARY MESSAGE SERVER TELEPHONE # | 24 DIGITS (12 BCD BYTES) |
| BACKUP MESSAGE SERVER TELEPHONE # | 24 DIGITS (12 BCD BYTES) |
| FIRST POLL TIME | 3 BINARY BYTES (HH:MM:SS) |
| SECOND POLL TIME | 3 BINARY BYTES (HH:MM:SS) |
| THIRD POLL TIME | 3 BINARY BYTES (HH:MM:SS) |
| FOURTH POLL TIME | 3 BINARY BYTES (HH:MM:SS) |
| FIFTH POLL TIME | 3 BINARY BYTES (HH:MM:SS) |
| NUMBER OF RETRY POLLS | 1 BINARY BYTE (0 ≤ BUFFER VALUE ≤ 10) |
| RETRY POLL DELAY TIME | 1 BINARY BYTE (REPRESENTING 10 SECOND INTERVALS) |
| DISPLAY MESSAGE | 60 ASCII BYTES |
| PRIMARY PAGE RESPONSE SERVER TELEPHONE # | 24 DIGITS (12 BCD BYTES) |
| BACKUP PAGE RESPONSE SERVER TELEPHONE # | 24 DIGITS (12 BCD BYTES) |
| INITIAL POLL DELAY | 1 BINARY BYTE (REPRESENTING 10 SECOND INTERVALS) |
| RETRY POLL DELAY TIME | 1 BINARY BYTE (REPRESENTING 10 SECOND INTERVALS) |
| NUMBER OF RETRY POLLS | 1 BINARY BYTE (0 ≤ BUFFER VALUE ≤ 15) |
| DISPLAY MESSAGE | 60 ASCII BYTES |
| PRIMARY MESSAGE SENDING SERVER TELEPHONE # | 24 DIGITS (12 BCD BYTES) |
| BACKUP MESSAGE SENDING SERVER TELEPHONE # | 24 DIGITS (12 BCD BYTES) |
| NUMBER OF RETRY POLLS | 1 BINARY BYTE (0 ≤ BUFFER VALUE ≤ 15) |
| RETRY POLL DELAY TIME | 1 BINARY BYTE (REPRESENTING 10 SECOND INTERVALS) |
| DISPLAY MESSAGE | 60 ASCII BYTES |
| SECURITY CODE | 4 BYTE BINARY |

| Field | Format | Ref |
|---|---|---|
| PRIMARY FSU SERVER TELEPHONE # | 24 DIGITS (12 BCD BYTES) | 314 |
| BACKUP FSU SERVER TELEPHONE # | 24 DIGITS (12 BCD BYTES) | 316 |
| NUMBER RETRY POLLS | 1 BINARY BYTE (0 ≤ BUFFER VALUE ≤ 10) | 318 |
| RETRY POLL DELAY TIME | 1 BINARY BYTE (REPRESENTING 10 SECOND INTERVALS) | 320 |
| NEXT TIME TO CALL SERVER | 5 BINARY BYTES (MM:DD:HH:MM:SS) | 322 |
| DISPLAY MESSAGE | 60 ASCII BYTES | 324 |
| SECURITY CODE | 4 BYTE BINARY | 326, 327 |
| POLL PROXIMITY THRESHOLD | 1 BINARY BYTE (REPRESENTING 1 SECOND INTERVALS) | 328 |
| CPE IDLE TIME THRESHOLD | 1 BINARY BYTE (REPRESENTING 1 SECOND INTERVALS) | 329 |
| CALL TIME-OUT THRESHOLD | 1 BINARY BYTE (REPRESENTING 1 SECOND INTERVALS) | 330 |
| FEATURE DISABLE ERROR THRESHOLD | 1 BINARY BYTE (REPRESENTING NUMBER OF FAILURES) | 332 |
| NUMBER OF MDP FAILURES | 1 BINARY BYTE | 334 |
| NUMBER OF SPP FAILURES | 1 BINARY BYTE | 336 |
| NUMBER OF IRN FAILURES | 1 BINARY BYTE | 338 |
| NUMBER OF CRC FAILURES | 1 BINARY BYTE | 339 |
| NUMBER OF FSU FAILURES | 1 BINARY BYTE | 340 |
| NUMBER OF MSR FAILURES | 1 BINARY BYTE | 342 |
| CPE ID | 4 BINARY BYTE | |
| REGULATORY PARAMETER LIMITS | ARRAY (PARAMETER/MAX VALUE/MIN VALUE) | |
| ERROR LOG ENTRY # 1 | TIME/SUBROUTINE/LOCATION/DELIMITER | 345 |
| *** | *** | |
| ERROR LOG ENTRY # n | TIME/SUBROUTINE/LOCATION/DELIMITER | 343 |

264, 266

To Figure 10A

To Figure 10C

| READ ONLY MEMORY | |
|---|---|
| MAIN LOOP | 358 |
| AUTONOMOUS CALLING MODULE | 360 |
| TIMEKEEPING INTERRUPT HANDLER | 362 |
| ORIGINATING SUBROUTINE | 364 |
| RETRY SUBROUTINE | 366 |
| BACKUP SUBROUTINE | 368 |
| MDP SUBROUTINE | 370 |
| CRC SUBROUTINE | 372 |
| FSU SUBROUTINE | 374 |
| SPP SUBROUTINE | 376 |
| IRN SUBROUTINE | 678 |
| MSR SUBROUTINE | 380 |
| QUEUE RETRY/BACKUP SUBROUTINE | 382 |
| "POLL" SUBROUTINE | 384 |
| "MESG" SUBROUTINE | 386 |
| "SCRI" SUBROUTINE | 388 |
| "REMI" SUBROUTINE | 389 |
| FOREGROUND TASK INTERRUPT HANDLER | 390 |

Figure 11

METHOD, SYSTEM AND APPARATUS FOR CAUSING CUSTOMER PREMISES EQUIPMENT TO AUTOMATICALLY CALL A TELECOMMUNICATIONS SERVER

BACKGROUND OF THE INVENTION

This invention relates to customer premises equipment (CFE) that is enabled to autonomously call a telecommunications server, including a Stored Program Computer System (SPCS).

As CPEs are built with increased computational power, it has become desirable for them to communicate regularly with an SPCS server both to exchange data and to update their local configuration and programming scripts. Such communication is most sensibly conducted over the pre-existing Public Switched Telephone Network (PSTN) to which both the CPE and the SPCS are connected.

It is desirable that communication between the CPE and the SPCS not unduly interfere with the CPE's conventional use as a telephone. For this reason, it would be inappropriate for the SPCS to initiate a call to the CPE because, in the absence of a CPE ring-suppression mechanism, the CPE would ring and thereby misleadingly summon its user. It is therefore desirable for the CPE to autonomously call the SPCS on a regular basis or in response to specific events.

SUMMARY OF THE INVENTION

In accordance with one aspect of the invention, there is provided a method of receiving information at customer premises equipment. The method includes the steps of transmitting an information request message from the CPE to a messaging platform and receiving information from the messaging platform in response to the information request message.

In accordance with another aspect of the invention, there is provided a method of providing messaging services at customer premises equipment. The method includes the steps of transmitting an information request message from the CPE to a messaging platform and receiving information from the messaging platform in response to the information request message.

In accordance with another aspect of the invention, there is provided an apparatus for receiving information at customer premises equipment. The apparatus includes a transmitter for transmitting an information request message from the CPE to a messaging platform and a receiver for receiving information from the messaging platform in response to the information request message.

Preferably, the transmitter is operable to receive at least one stimulus and transmit the request message in response to the stimulus.

In one embodiment, the apparatus includes a timer tor identifying a pre-defined time, the timer being operable to stimulate the transmitter to transmit the message at a pre-defined time.

In one embodiment, the apparatus includes a timer for identifying pre-defined intervals, the timer being operable to stimulate the transmitter to transmit the message at the pre-defined intervals.

In one embodiment, the apparatus includes a CLID receiver for receiving CLID information and a processor for determining whether or not the CLID information meets a pre-defined criteria and if so stimulating the transmitter to transmit the message.

Preferably, the transmitter includes a dialler and the dialler is operable to dial a first predefined telephone number. Preferably, the dialler is operable to transmit the information request using DTMP signals and the dialler is operable to dial at least one alternate telephone number when the first pre-defined telephone number is unavailable.

Preferably, the receiver is operable to receive the requested information according to the ADSI protocol.

In accordance with another aspect of the invention, there is provided an apparatus for providing messaging services at customer premises equipment. The apparatus includes a transmitter for transmitting an information request message from the CPE to a messaging platform and a receiver for receiving information from the messaging platform in response to the information request message.

In accordance with another aspect of the invention, there is provided a system for providing messaging services at customer premises equipment. The system includes a messaging platform for receiving and storing messages, the messaging platform including a receiver for receiving information request messages and a transmitter for transmitting information and customer premises equipment. The customer premises equipment includes a transmitter for transmitting an information request message from the CPE to the messaging platform and a receiver for receiving information from the messaging platform in response to the information request message.

Preferably, the apparatus includes a public telephone network, the CPE and the messaging platform being operable to communicate over the public telephone network.

In one embodiment, the information includes an e-mail message or a page.

Preferably, the transmitter in the messaging platform includes a FSK transmitter for transmitting the information in an FSK format to the CPE and preferably, the receiver in the CPE includes an FSK receiver for receiving the information in an PSK format.

Preferably, the information is provided to the CPE in accordance with an ADSI protocol extension.

Preferably, the transmitter at the CPE includes a DTMF transmitter and the receiver at the messaging platform includes a DTMF receiver, the information request message being transmitted to the messaging platform in DTMF signals.

In one sense, the present invention is directed to a CPE that autonomously calls a selection of SPCS servers in response to six types of stimulus.

In Multiple Daily Polling (MDP) the CPE logs into its main SPCS according to a regular schedule, both to exchange message data and to update local configuration parameters and programming script.

In Sent Page Polling (SPP), the CPE logs into a paging system SPCS to determine whether a page that the CPE had previously transmitted has been read and responded to yet.

In Calendar Reminder Calling (CRC), the CPE logs into a message upload SPCS to transmit to a particular subscriber a reminder page regarding an upcoming event.

In Intelligent Remote Notification (IRN), the CPE logs into a message upload SPCS to transmit a page to a particular subscriber confirming that the CPE has received a telephone call from a predefined telephone number.

In Feature Download Management (FDM) Slot Updating (FSU), the CPE logs into a script SPCS to commence an FDM session to update its programming scripts.

In Message Sending Retrying (MSR), the CPE logs into a message upload SPCS to attempt to upload a page that the CPE user had previously tried to upload manually without success.

An autonomous calling system must overcome certain challenges. The SPCS will be busy some of the times that the CPE, calls. Or a communication channel problem might develop during a connect session. The present invention provides for the CPR to retry unsuccessful calls and to call backup SPCSs when connecting to a primary SPCS has been continuously problematic.

The present invention further provides that the CPE will terminate an ongoing autonomous call when a user engages the CPE through actions that include lifting the handsct and operating the keypad. Where the user has recently operated the CPE, the invention provides that autonomous calls be delayed until sufficient idle time has passed to indicate that the user no longer requires the CPE for his own use. These provisions will sometimes require that the CPE retry autonomous calls at a later time.

The mechanism for achieving this functionality includes extensions to the core Analogue Display Services Interface (ADSI) protocol through which an SPCS transmits information for display at the CPE. In particular, certain new Switch To Application (STA) codes are defined to control and reconfigurc the CPE under the direction of the SPCS.

BRIEF DESCRIPTION OF THE DRAWINGS

These and other features, advantages, and aspects of the present invention will become better understood with reference to the following description, appended claims and accompanying drawings in which:

FIG. 2 is a tabular representation of families of Analog Display Services Interface (ADSI) switch to application (STA) code extensions that facilitate autonomous connection of the CPE to the SPCS;

FIG. 3 is a tabular representation of ADSI STA codes that comprise a subset of a "QUER" family of ADSI STA code extensions illustrated in FIG. 2; FIG. 4 is a tabular representation of ADSI STA codes that comprise a subset of a "FONE" family of ADST STA code extensions illustrated in FIG. 2;

FIG. 5 is a tabular representation of ADSI STA codes that comprise a subset of a "MESG" family of ADSI STA code extensions illustrated in FIG. 2;

FIG. 6 is a tabular representation of ADSI STA codes that comprise a subset of a "SCRI" family of ADSI STA code extensions illustrated in FIG. 2;

FIG. 7 is a tabular representation of ADSI STA codes that comprise a subset of a "POLL" family of ADSI STA code extensions illustrated in FIG. 2;

FIG. 8 is a tabular re-presentation of ADSI STA codes that comprise a subset of a "REMI" family of ADSI STA code extensions illustrated in FIG. 2;

FIG. 10A–C are a tabular representation of the organization of a segment of a non-volatile FLASH memory in the CPE illustrated in FIG. 1;

FIG. 11 is a tabular representation of programs encoded in a segment of a Read Only Memory (ROM) in the CPE illustrated in FIG. 1;

DETAILED DESCRIPTION

FIG. 1

Figure 1:
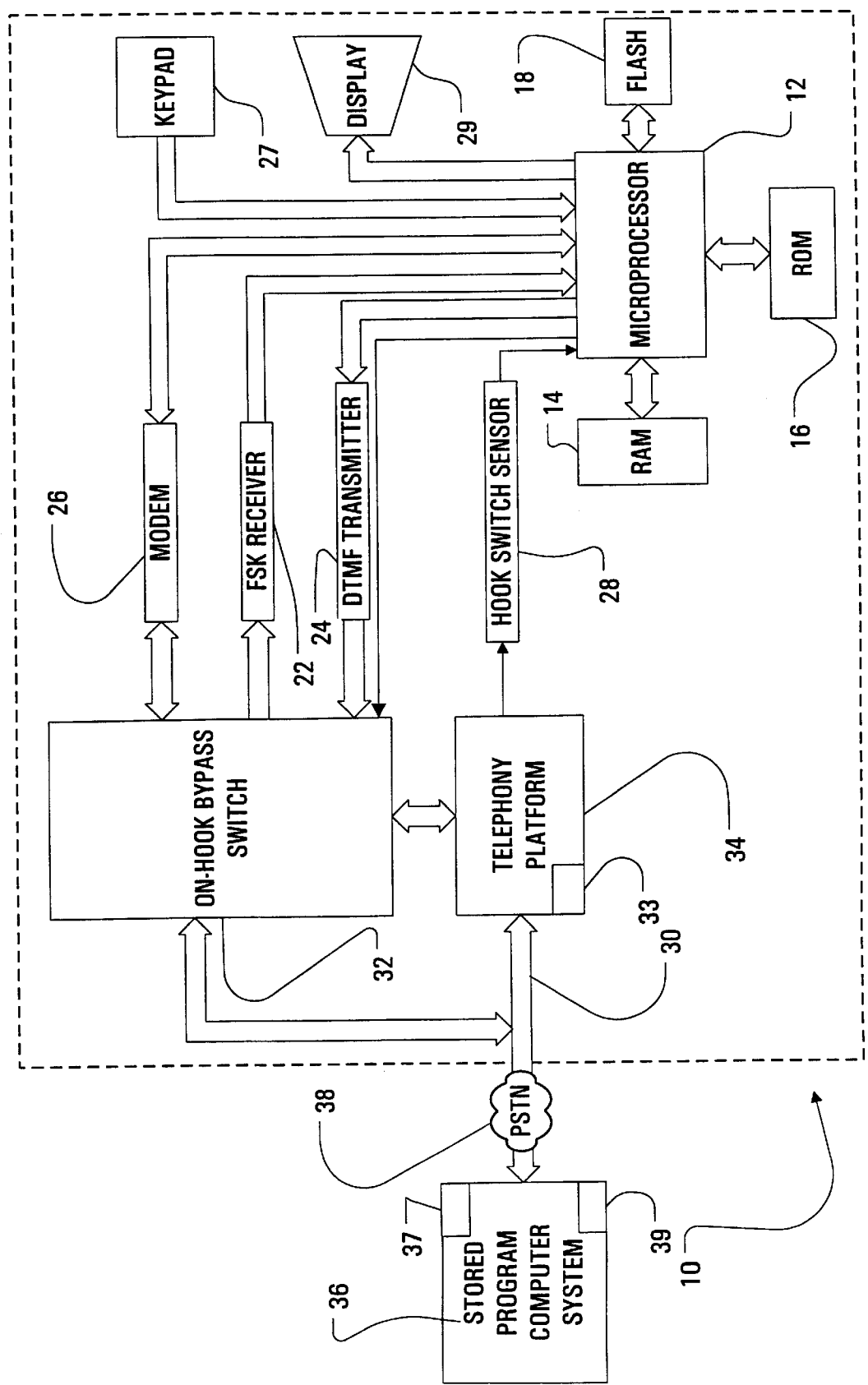
FIG. 1 is a block diagram of a customer premises equipment (CPE) apparatus according to a first aspect of the invention, the apparatus including circuitry enabling it to autonomously connect to a stored program computer system (SPCS) server through a public switched telephone network.

Referring to FIG. 1, a customer premises equipment (CPE) apparatus according to a first embodiment of the invention is generally illustrated at 10. A conventional tip and ring loop 30 connects the CPE 10 to a public switched telephone network (PSTN) 38. A stored program computer system (SPCS) 36 is connected to the CPE 10 through the PSTN 38 and the tip and ring loop 30. The CPE 10 is enabled to autonomously call the SPCS 36 to exchange page messages as well as to download configuration parameters and programming scripts. This autonomous connection ensures both that page messages to and from the user of the CPE are regularly delivered and that the CPE 10 itself is maintained properly configured.

The SPCS 36 runs a messaging platform and has an FSK transmitter 37 for transmitting information to the CPE and has a DTMF receiver 39 for receiving information request messages from the CPE.

The CPE 10 includes a microprocessor 12, and memory including Random Access Memory (RAM) 14, Read Only Memory (ROM) 16, and non-volatile random access memory 18, in this embodiment, Flash EEPROM (FLASH), all connected to be controlled by and to exchange data with the microprocessor 12. It has been found that the Mitsubishi 37702 16-bit microprocessor having 2 K of RAM and 32 K of ROM on-chip and having conventional address and data buses is suitable as the microprocessor 12. It has also been found that AMD 29040 Flash EEPROM is suitable as the FLASH 18. The RAM 14 and the ROM 16 are conventional.

The CPR 10 is further connected to control and exchange data with a Frequency Shift Key (FSK) receiver 22, a Dual Tone Multi-Frequency (DTMF) transmitter 24, a modem 26, a display 25 and a keypad 27, each of which has a designated address space. The microprocessor 12 is operable to cooperate with the DTMP transmitter to act as a dialler for dialling telephone numbers and is operable to present messages at the display 25 and to receive user instructions at the keypad 27.

A conventional hook switch sensor 28 is connected to provide an off-hook signal to the microprocessor 12 to indicate whether or not the CPE handset (not shown) is on or off hook. A telephony platform 34 and an off-hook bypass switch 32 are connected in parallel to the tip and ring loop 30. Moreover, the off-hook bypass switch 32 is connected indirectly to the tip and ring loop 30 through the telephony platform 34.

The FSK receiver 22, the DTMF transmitter 24, and the modem 26 are each connected to the tip and ring loop 30 via the off-hook bypass switch 32 which, under the direction of the microprocessor 12 as informed by the hook switch sensor 28, routes this connection either directly to the network side of the tip and ring loop 30 or indirectly to the tip and ring loop 30 through the telephony platform 34. The on-hook bypass switch 32 therefore enables the microprocessor 12 and the SPCS 36 to communicate at all times regardless of the hook state of the CPE 10

In most situations, information from the SPCS 36 is conveyed to the microprocessor 12 via the FSK receiver 22 and information from the microprocessor 12 is conveyed to the SPCS 36 via the DTMF transmitter 24. For large uploads, the SPCS 36 may be connected to communicate at higher speed with the microprocessor 12 via the modem 26.

The core Analog Display Services Interface (ADSI) standard specifies a mechanism for presenting SPCS 36 information at the CPE 10. The SPCS 36 and the CPE 10 both comply with the standard ADSI protocol and the SPCS 36 is enabled to transmit messages for presentation at the CPE 10 on the display 25. Despite this limited scope, the standard ADSI protocol does provide a foundation on which to build additional functionality. This foundation is the Switch To Application (STA) code. Where both SPCS 36 and CPE 10 are programmed to interpret a particular set of extended STA codes communicated in the course of a standard ADSI session, further functionality is enabled.

FIG. 2

Referring to FIGS. 1 and 2, families of ADSI STA extension codes are generally illustrated in tabular form at 40. These families 40 are an aspect of the present invention and are not specified in the core ADSI protocol. These families 40 are formatted to comply with the requirements for extended STA codes as set forth in the ADSI protocol as defined in Bellcore standard TR-1273 rev.1, which is incorporated herein by reference.

The ADSI protocol standard specifies that all ADSI STA codes have a specific format. Each extended STA code must be a minimum of six bytes in length and a maximum of 255 bytes in length. A first byte (42) must represent the value "151d" which is the parameter defined to signify that the SPCS 36 is requesting the CPE 10 to switch to, or in other words commence, an application (Switch To Application—STA). A second byte (44) specifies the length of the STA message, which must be between 6 and 255 bytes long. Bytes 3 through 6 (46, 48, 50, 52) specify an application code that designates the specific application that the CPE 10 is being requested to commence. In the present embodiment, the application code 46, 48, 50, 52 is the set of ASCII values:

"Q" "U" "E" "R", "F" "O" "N" "E", "M" "E" "S" "G", "S" "C" "R" "I", "P" "O" "L" "L", or "R" "E" "M" "I", which conveniently form mnemonics representing respectively; QUERying application 54, FONE (phone) controlling application 55, MESsaGing application 56, SCRIpt application 58, POLLing application 60, and REMInder application 61. As specified in the standard ADSI protocol, an STA code might further include application specific data. In this embodiment, the application specific data includes a one byte action code 62 and a data stream 64 associated with the action code 62, the data stream 64 having a length of between 1 and 248 bytes and a format dictated by the action code 62. The action code 62 can be understood to represent a command transmitted by the SPCS 36 to the CPU 10.

FIG. 3

Referring to FIGS. 1,2 and 3, there is tabulated a subset, generally illustrated at 66, of STA messages 54 comprising an ADSI protocol extension QUER for enabling the SPCS 36 to query the CPE 10. The subset 66 includes a first query 68 that performs the following operation:

"QUERY: What communication mode is the CPE 10 seeking to establish with the SPCS 36?"

The first query 68 is identified by the action code 62 $81 and passes no data 64. The first query 68 enables the SPCS 36 to determine the purpose of the call, be it to upload data, download data, update its configuration parameters, or download new scripts.

FIG. 4

Referring to FIGS. 1,2 and 4, there is tabulated a subset, generally illustrated at 67, of STA messages 55 comprising an ADSI protocol extension FONE for enabling the SPCS 36 to remotely control the CPR 10. The subset 67 includes a first command 69 that performs the following operation:

"COMMAND: This marks the end of this connect session. Acknowledge successful session completion with a DTMF "B" and then release the telephone line."

This first command 69 is identified by the action code 62 $01 and passes no data 64. The first command 69 enables the SPCS 36 to cleanly terminate a connect session.

FIG. 5

Referring to FIGS. 1,2 and 5, there is tabulated a subset, generally illustrated at 70, of STA messages 56 comprising an ADSI protocol extension MESG for enabling the SPCS 36 to configure parameters within the CPE 10 that affect: Intelligent Remote Notification (IRN), Calendar Reminder Call (CRC), and Message Sending Retry (MSR) sessions. The subset 70 includes a first command 72 that performs the following operation:

"COMMAND: Parse and store into FLASH 18 the enclosed updated configuration parameters."

This first command 72 is identified by the action code 62 $18 and passes to the CPE 10 data 64 including bytes 1 through 12 which represent the primary message sending server telephone number in binary coded decimal (BCD) format (74), byte 13 which is a delimiter $FF (76), bytes 14 through 25 which represent the backup message sending server telephone number in BCD format (78), byte 26 which is a delimiter FP (80), byte 27 which represents in binary format the number of times that the CPE 10 is to retry the SPCS 36 if no successful connection has been achieved (82), byte 28 which represents the time delay between consecutive connection retries measured in 10-second increments and stored in binary format (84), bytes 29 through 89 which represent a text message in ASCII format to be displayed at the CPE display 25 during an IRN, CRC, or MSR session (86), byte 90 which is a delimiter FF (88), bytes 91 through 94 which represent the current IRN/CRC/MSR security code in binary format (90), byte 95 is a delimiter $FF (92), bytes 96 through 103 represent a new IRN/CRC/MSR security code in binary concatenated twice for confirmation (94), and byte 104 is an end of data delimiter $FF (96).

These parameter data lengths are maximum lengths. In use, some parameters may have a shorter data length than indicated, in which case the delimiter $FF ensures proper separation. The telephone numbers specified for the primary and backup servers are dialable BCD strings, where the digits 1 through 9 are represented by their respective nibbles. DTMF "*" is represented by nibble $A. DTMF "0" is represented by nibble $B. DTMF "#" is represented by nibble $C. Other nibbles are not dialled and terminate the BCD string.

FIG. 6

Referring to FIGS. 1,2 and 6, there is tabulated a subset, generally illustrated at 98, of STA messages 58 comprising an ADSI protocol extension SCRI for enabling the SPCS 36 to configure the parameters within the CPE 10 that control the Feature Download Management (FDM) Slot Update (FSU) feature. The subset 98 includes a first command 99 that performs the following operation:

"COMMAND: Commence a non-interactive FDM session within the current Server Display Control (SDC) session."

This first command 99 is identified by the action code 62 $01 and passes data 64 structured as a four byle binary CPE identification code (CPE-ID) 101.

The FSU subset 98 also includes a second command 100 that performs the following operation:

"COMMAND: Parse and store into FLASH 18 the enclosed updated configuration parameters."

This second command 100 is identified by the action code 62 $06 and passes data 64 structured as follows: bytes 1 through 4 represent the FDM number in binary format (102), bytes 5 through 8 represent the FSU security code in binary format (104), bytes 9 through 12 represent the time to next call the SPCS 36 in BCD format as month/day/hour/minute (106), byte 13 is a delimiter $FF (108), bytes 14 through 26 represent the FSU server telephone number in BCD format (110), byte 27 is a delimiter $FF (112), bytes 28 through 39 represent the backup FSU server telephone number in BCD format (114), byte 40 is a delimiter $FF (116), byte 41 represents in binary format the number of times that the CPE 10 is to retry the SPCS 36 if no successful connection has been achieved (118), byte 42 represents the time delay between consecutive connection retries measured in 10 second increments and stored in binary format (120), bytes 43 through 102 represent a text message in ASCII format to be displayed at the CPE display 25 during an FSU session (122), and byte 90 is an end of data delimiter $FF (124).

These parameter data lengths are maximum lengths. In use, some parameters may have a shorter data length than indicated, in which case the delimiter $FF ensures proper separation. The telephone numbers specified for the primary and backup servers are dialable BCD strings, where the digits 1 through 9 are represented by their respective nibbles. DTMF "*" is represented by nibble $A. DTMP "0" is represented by nibble $B. DTMF "#" is represented by nibble $C. Other nibbles are not dialled and terminate the BCD string.

FIG. 7

Referring to FIGS. 1,2 and 7, there is tabulated a subset, generally illustrated at 126, of STA messages 60 comprising an ADSI protocol extension POLL for enabling the SPCS 36 Lo configure the parameters within the CPE 10 that affect the Multiple Daily Polling sessions (MDP) and the Sent Page Polling sessions (SPP).

A first command 128 performs the following operation:

"COMMAND: Parse and store into FLASH 18 the enclosed updated MDP configuration parameters."

The first command 128 is identified by the action code 62 $01 and passes data 64 structured as follows: bytes 1 through 12 represent the primary messaging server telephone number in BCD format (130), byte 13 is a delimiter $FF (132), bytes 14 through 25 represent the backup messaging server telephone number in BCD foxmat (134), byte 26 is a delimiter $FF (136), bytes 27–28 represent the first daily poll time in BCD stored as hour/minute (138), bytes 29–30 represent the second daily poll time in BCD stored as hour/minute (140), bytes 31–32 represent the third daily poll time in BCD stored as hour/minute (142), bytes 33–34 represent the fourth daily poll time in BCD stored as hour/minute (144), bytes 35–36 represent the fifth daily poll time in BCD stored as hour/minute (146), byte 37 is a delimiter $FF (148), byte 38 represents in binary format the number of times that the CPE 10 is to retry the PCS 36 if no successful connection has been achieved (150), byte 39 represents the time delay between consecutive connection retries measured in 10 second increments and stored in binary format (152), bytes 40 through 99 represent a text message in ASCII format to be displayed at the CPE display 25 during an MDP session (154), and byte 100 is an end of data delimiter $FF (156).

The second command STA 158 performs the following operation:

"COMMAND: Parse and store into FLASH 18 the enclosed updated SPP configuration parameters."

The second command 158 is identified by the action code 62 $02 and passes data 64 structured as follows: bytes 1 through 12 represent the primary page response server telephone number in BCD format (160), byte 13 is a delimiter $FF (162), bytes 14 through 25 represent the backup page response server telephone number in BCD format (164), byte 26 is a delimiter $FF (166), byte 27 represents the delay measured in 10 second increments and stored in binary format between the time when the CPE 10 originally sent a page and the time that the CPB 10 is to check with the SPCS 36 whether the page has been received (168), byte 28 represents the time delay between consecutive connection retries measured in 10 second increments and stored in binary format (170). byte 29 represents in binary format the number of times that the CPE 10 is to retry the SPCS 36 if no successful connection has been achieved (172), bytes 30 through 89 represent a text message in ASCII format to be displayed at the CPE display 25 during an SPP session (174), and byte 90 is an end of data delimiter $FF (176).

These parameter data lengths are maximum lengths. In use, some parameters may have a shorter data length than indicated, in which case the delimiter $FF ensures proper separation. The telephone numbers specified for the primary and backup servers are dialable BCD strings, where the digits 1 through 9 are represented by their respective nibbles. DTMF "*" is represented by nibble $A. DTMF "0" is represented by nibble $B. DTMF "#" is represented by nibble $C. Other nibbles are not dialled and terminate the BCD string.

FIG. 8

Referring to FIGS. 1,2 and 8, there is tabulated a subset, generally illustrated at 127, of STA messages 61 comprising an ADSI protocol extension REMI for enabling the SPCS 36 to manipulate in CPE FLASH 18 Calendar Reminder Call (CRC) events. The subset 127 includes a first command 129 that performs the following operation: "COMMAND: Parse and store into FLASH 18 the enclosed calendar reminder call event"

This first command 129 is identified by the action code 62 $01 and passes to the CPE 10 data 64 structured as follows: bytes 1 through 4 represent the event time in binary formatted as (MM;DD:HH:MM) 131, bytes 5 through 8 represent the reminder time in binary formatted as (MM:DD:HH:MM) 133, byte 9 represents the repeating status of the event (daily, weekly, monthly, yearly, non-repeating) in binary format 135, bytes 10 through 69 represent the reminder message in ASCII format 137, byte 70 is a delimiter $FF 139, and bytes 71 through 82 represent in BCD format the telephone number of the pager that will receive the reminder message 141.

These parameter data lengths are maximum lengths. In use, some parameters may have a shorter data length than indicated, in which case the delimiter $FF ensures proper separation. The telephone numbers specified for the primary and backup servers are dialable BCD strings, where the digits 1 through 9 are represented by their respective nibbles. DTMF "*" is represented by nibble $A. DTMF "0" is represented by nibble $B. DTMF "#" is represented by nibble $C. Other nibbles are not dialled and terminate the BCD string.

Generally, the first command is used to download reminder times and paging messages which the processor compares to the system clock to determine when to transmit an information request message.

FIG. 9

Figure 9:
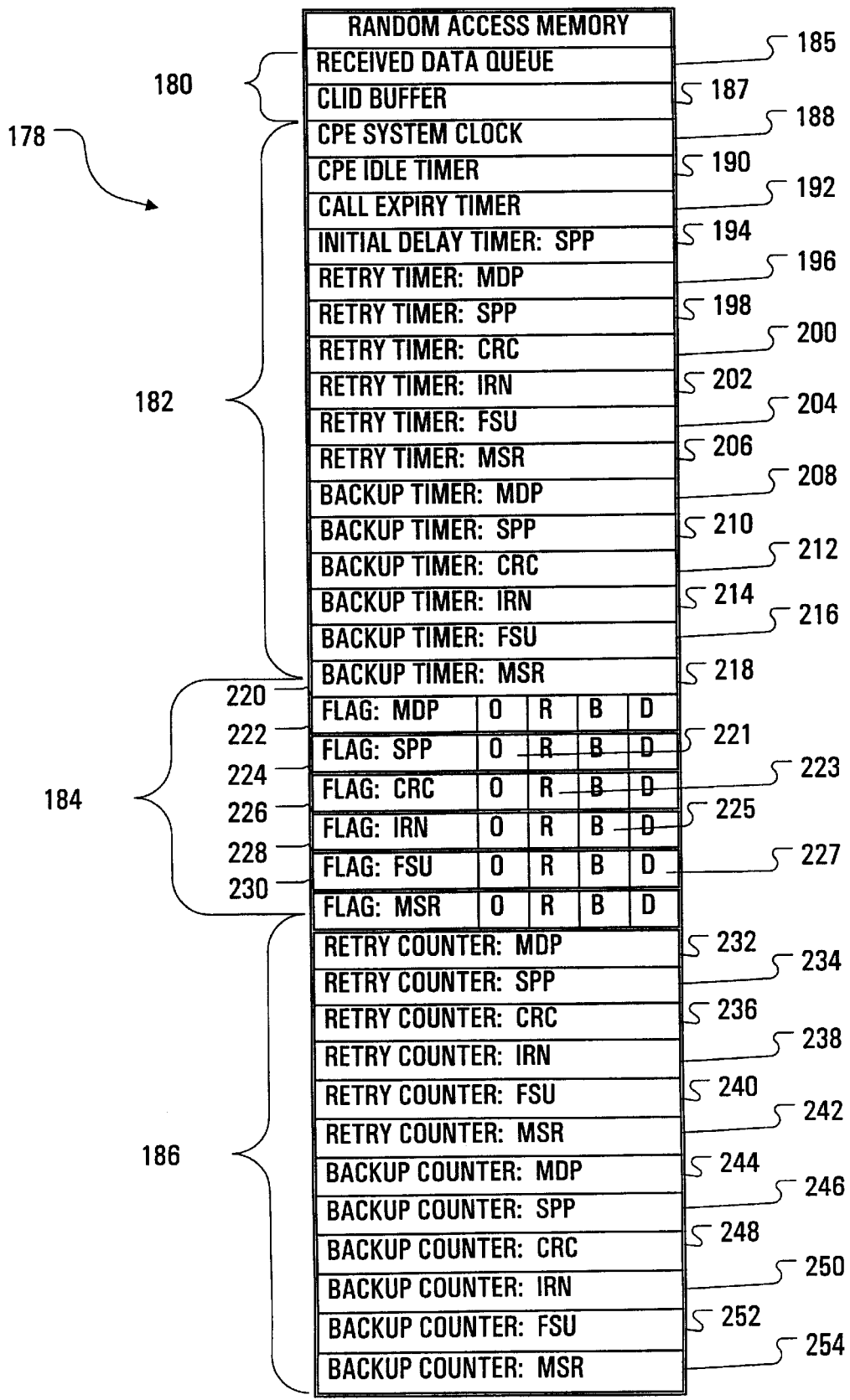
FIG. 9 is a tabular representation of the organization of a segment of a Read only Memory (RAM) in the CPE illustrated in FIG. 1.

Referring to FIGS. 1 and 9, the structure of a segment of the RAM 14 is generally illustrated in tabular form at 178. The RAM 14 is configured into four main blocks: a block of buffers 180, a block of clocks and timers 182, a block of status flags 184, and a block of counters 186.

The block of buffers 180 includes a received data queue 185 and a Calling Line Identification Delivery (CLID) buffer 187.

The received data queue 185 is conventional and is configured to queue ADSI messages as they arrive at the CPE from the SPCS 36. The ADSI standard data-link layer verifies inbound data and the received data queue 185 is connected to receive only complete and verified ADSI messages. The received data queue 185 maintains separate read and write pointers (not illustrated) to indicate the specific queue location where reading or writing is to next commence.

The CLID buffer 187 receives for storing the most recent CLID data to be received by the CPE 10.

The block of clocks and timers 182 is a set of RAM 14 locations that store values formatted as either calendar time or raw time. These values are regularly updated by the clock portion of the microprocessor 12.

A system clock 188 tracks the current date and time. A CPE 10 idle timer 190 monitors the period of time that the CPE 10 has been idle, untouched by its user. A call expiry timer 192 monitors the length of any autonomous call to enforce a maximum duration limit. An initial SPP delay timer 194 measures the delay between the time that the CPE 10 sends a page and the time that it initiates an autonomous call to search for a response to that page. A set of retry timers 196, 198, 200, 202, 204, 206 measures the delay between an unsuccessful autonomous calling session, whether MDP, SPP, CRC, IRN, FSU, or MSR, and the next retry attempt. A set of backup timers 208, 210, 212, 214, 216, 218 measures the delay between an unsuccessful autonomous calling session, whether MDP, SPP, CRC, IRN, is FSU, or MSR, and the next attempt to connect to a backup server.

The block of status flags 184 includes a designated flag 220, 222, 224, 226, 228, 230 for each session type MDP, SPP, CRC, IRN, FSU, and MSR to indicate whether it is time to initiate such a session. Each flag 220, 222, 224, 226, 228, 230 comprises four indicators chat determine whether it is time to originate a session 221, to retry a session 223, to try a backup session 225, or to disable further such sessions 227 pending correction of an unacceptable error level.

The block of counters 186 includes a respective counter 232, 234, 236, 238, 240, 242 to monitor the number of retry attempts for each session type MDP, SPP, CRC, IRN, FSU and a respective counter 244, 246, 248, 250, 252,254 to monitor the number of attempts to connect to a backup server for each type of session MDP, SPP, CRC, IRN, FSU.

FIG. 10

Figure 10C:

With reference to FIGS. 1 and 10, the structure of a segment of the FLASH 18 memory is generally illustrated at 256 in tabular form. The FLASH 19 is arranged into six main blocks: a block storing the configuration for MDP sessions 258, a block storing the configuration for SPP sessions 260, a block storing the configuration for IRN/CRC/MSR sessions 262, a block storing the configuration for FSU sessions 264, a block storing the global autonomous calling configuration 266, and a block storing user data 268.

The MDP configuration block 258 stores a primary message server telephone number 270, a backup message server telephone number 272, up to five polling times 274, 276, 278, 280, 282, a number of times to retry a server in the event of a failed autonomous call 284, a delay period between retry attempts 286, and a message to display at the CPE 10 during an MDP session 288.

The SPP configuration block 260 stores a primary page response server telephone number 290, a backup page response server telephone number 292, an initial delay between the time that the CPE 10 transmitted a page and the time when an SPP session is initiated to determine if the page has been received 294, a delay time period between attempts to retry a server in the event of a failed autonomous call 296, a maximum number of retry attempts 298, and a message to display at the CPE 10 during an SPP session 300.

The IRN/CRC/MSR configuration block 262 stores a primary message sending server telephone number 302, a backup message sending server telephone number 304, a maximum number of times to retry a server in the event of a failed autonomous call 306, a delay period between retry attempts 308, a message to display at the CPE 10 during an IRN, CRC, or MSR session 310, and a security code needed to log onto the server 312.

The FSU configuration block 264 stores a primary FSU server telephone number 314, a backup FSU server telephone number 316, a maximum number of times to retry a server in the event of a failed autonomous call 318, a delay period between retry attempts 320, the next time to call the server 322, a message to display at the CPE 10 during an FSU session 324, and a security code needed to log onto the server 326.

The global configuration block 266 stores a minimum separation between autonomous calling times 327, a minimum time that the CPE 10 must be idle before an autonomous call can be made 328, a maximum autonomous call duration 329, a maximum number of connection errors after which a particular type of session (MDP, SPP, IRN, CRC, FSU, MSR) will be disabled pending diagnosis 330, a cumulative number of connection errors for each type of session (MDP, SPP, IRN, CRC, FSU, MSR) 332, 334,336, 338, 340, 342, a four byte CPE identification number (CPE-ID) 339, a set of error log records 343 indicating the time and program location of each connection error, and an array 345 to store any maximum or minimum parameter values specified by telecommunication regulations.

The user data storage block 268 contains two types of data: calendar reminder call (CRC) data packets 344 and intelligent remote notification (IRN) data packets 346.

Each CRC data packet 344 includes a calendar time of an event 348, a calendar time to transmit an event reminder 350, an event repeat status flag 352 that can indicate unique, daily, weekly, monthly, and yearly events, a reminder message to be displayed 354, and a telephone number of the pager selected to receive the reminder message 349.

Each IRN data panket 346 includes a telephone number to be matched to Calling Line Identification Delivery data 351, a telephone number of an associated pager to be called in the event of a match 353, and a notification message to be displayed at the pager 355.

FIG. 11

Referring to FIGS. 1 and 11, the structure of a segment of the ROM 16 is generally illustrated at 356 in tabular form. The ROM 16 is programmed with codes representing instructions which direct the microprocessor 12 to perform various functions, including functions implementing: a Main Loop 358, an Autonomous Calling Module 360, a Timekeeping Interrupt Handler 362, an Originating Subroutine 364, a Retry Subroutine 366, a Backup Subroutine 368, an MDP Subroutine 370, a CRC Subroutine 372, an FSU Subroutine 374, an SPP Subroutine 376, an IRN Subroutine 368, an MSR Subroutine 380, a Queue Retry/Backup Subroutine 382, a POLL Subroutine 384, an MESG Subroutine 386, an SCRI Subroutine 388, an REMI Subroutine 389 and a Foreground Task Interrupt Handler 390.

Operation

FIG. 12

The operation of the CPE 10 and its interaction with the SPCS 36 will now be described with reference to FIG. 12 which is a flowchart of a Main Program Loop 358 as stored in the ROM 16.

Figure 12:
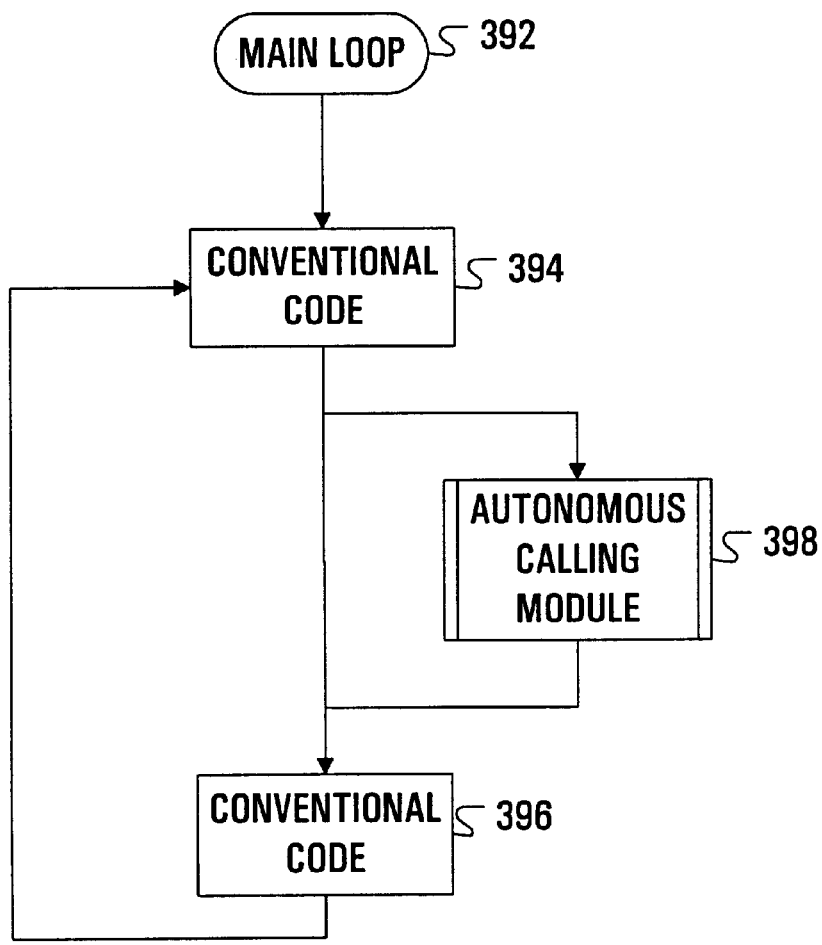
FIG. 12 is a flowchart of a Main Program loop encoded in the ROM as illustrated in FIG. 11.

Referring to FIGS. 1 and 12, the Main Loop 358 defines an initial state 392 from which the microprocessor 12 begins execution. Blocks 394 and 396 provide conventional code for directing the microprocessor 12 to control a CPE 10, including instructions: on receiving and reacting to general ADSI instructions from the SPCS 36, on how to switch between the voice and data modes as defined in the ADSI standard, on handling I/O interrupts from devices such as the keypad 27 and the hook switch sensor 28 and on how to implement certain other functionality not part of the invention, including creating, editing, and viewing messages at the CPE 10, editing the user data block 268 of FLASH 18, loading the CLID buffer 187 and updating the system clock 188. The functionality to receive and react to general ADSI instructions is interrupt driven and fully specified in Bellcore standard TR-1273 wherein only complete and valid ADSI instructions are accepted by the CPE 10. The microprocessor 12 is further configured to maintain all conventional stacks.

Block 398 defines an Autonomous Calling Module that provides code for directing the microprocessor 12 to perform the autonomous calling functions which are the subject of the present invention. As illustrated in FIG. 10, the Autonomous Calling Module 398 is located within the Main Loop 358 but does not obstruct other processing defined within the Main Loop 358.

FIG. 13

Figure 13:
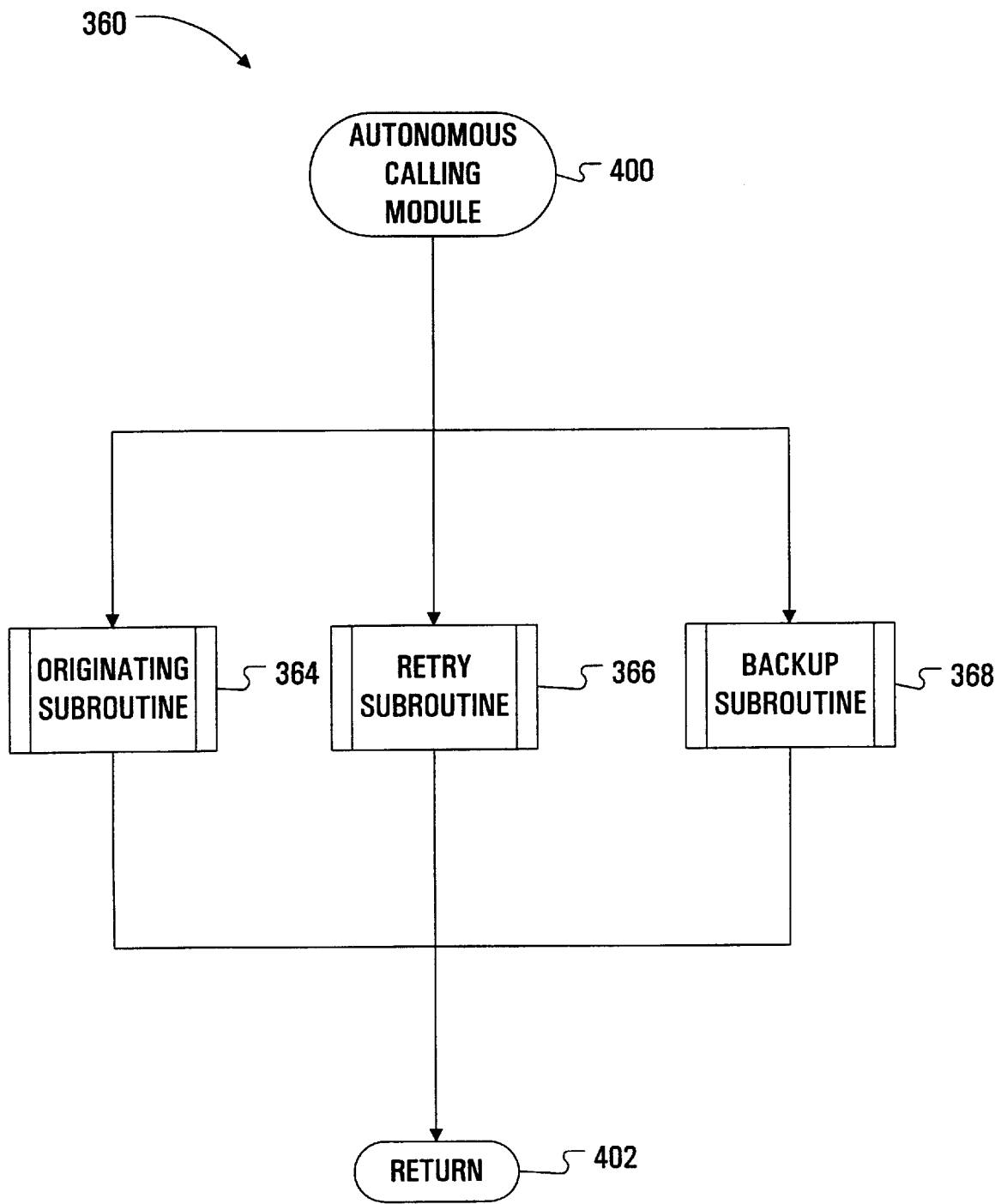
FIG. 13 is a flowchart of an Autonomous Calling Module encoded in the ROM as illustrated in FIG. 11.
Figure 14A:
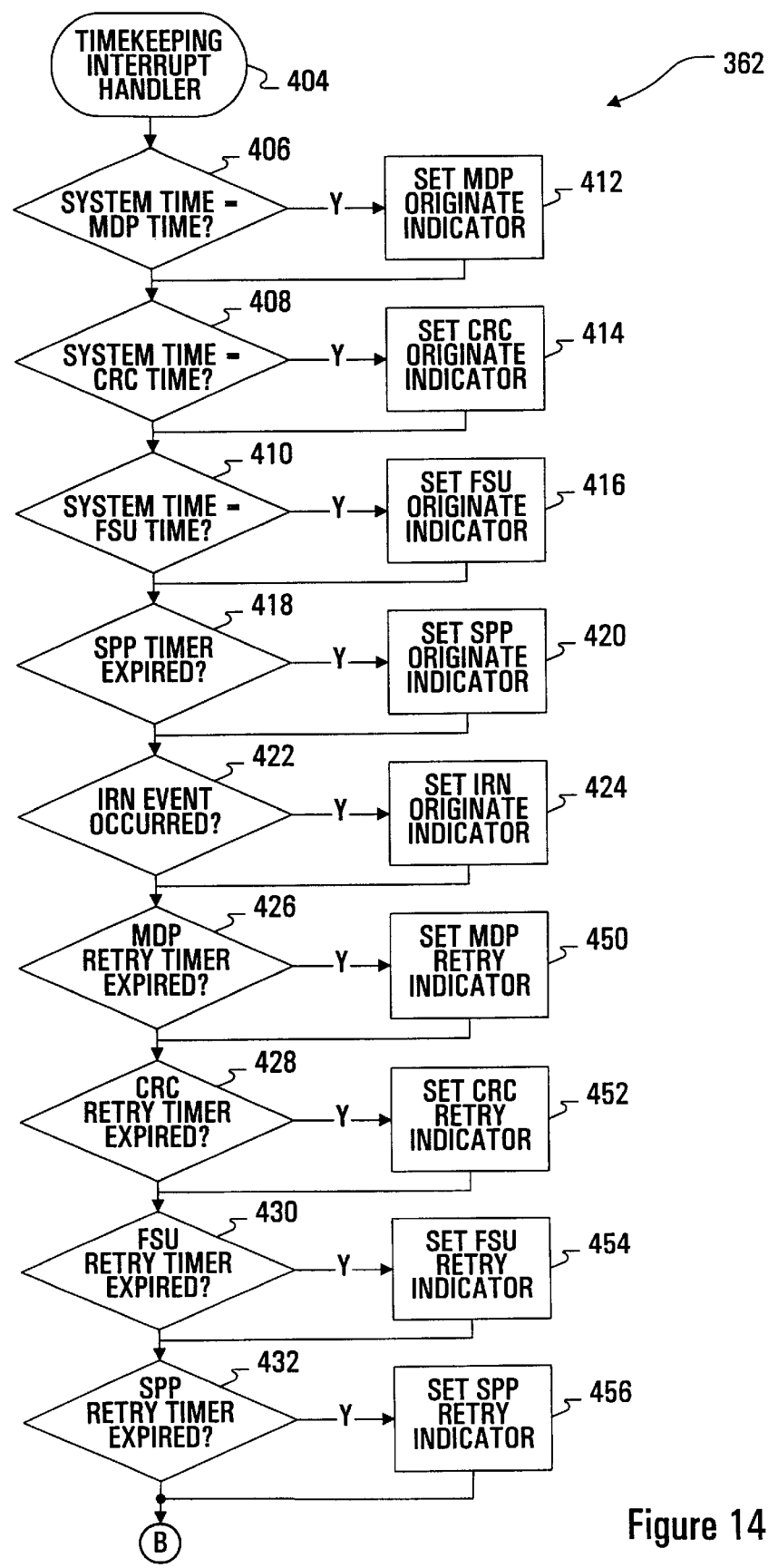
FIG. 14A and B are a flowchart of a Timkeeping Interrupt Handler encoded in the ROM as illustrated in FIG. 11.
Figure 14B:
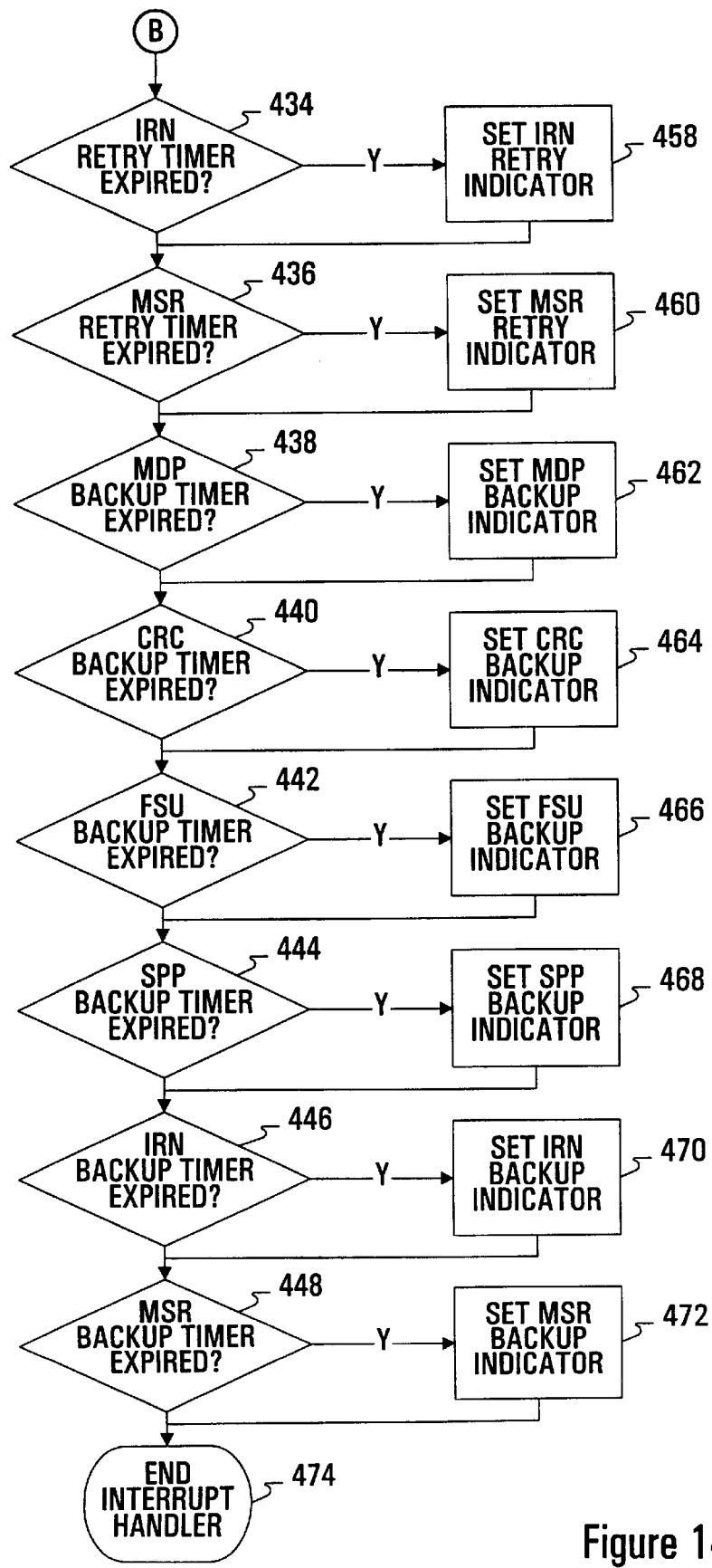

With reference to FIGS. 1 and 13, the Autonomous Calling Module is generally illustrated at 360 and defines an initial state 392 from which the microprocessor 12 begins execution. The Autonomous Calling Module 360 enables the CPE 10 to call the SPCS 36 upon the occurrence ot prespecified events.

In overview, upon the occurrence of an event or stimulus that triggers autonomous calling, the CPR 10 attempts to dial a predefined telephone number to call a specified primary server, ie., the messaging platform. If a successful exchange of all required data is completed, the CPE 10 stops. Alternatively, if the call is not successful, the CPE 10 will retry calling the specified server for a specified number of attempts, waiting a specified delay between attempts. If a successful exchange of all required data is completed, the CPE 10 stops. If no successful call is made, the CPE 10 will then attempt to dial a specified backup server a specified number of attempts, waiting a specified delay between attempts. If a successful exchange of all retired data is completed, the CPE 10 stops. If no successful call has been made, then the CPE 10 deems that it has failed and gives up on this particular trigger event. If a sufficient number of failures have been recorded for a particular class of trigger event, then the CPE 10 will disable that class of trigger event until the problem is diagnosed and corrected.

Proceeding now to describe the process in greater detail, the originating Subroutine 364, the Retry Subroutine 366, and the Backup Subroutine 368 in parallel direct the microprocessor 12 to determine if an originating, retry, or backup session is due, and if so, to commence one. When the microprocessor 12 has been directed to return from such subroutines, 364, 366, 368, then block 402 directs the microprocessor 12 to return to the Main Loop 358.

FIG. 14

With reference to FIGS. 1, 9, 10 and 14, the Timekeeping Interrupt Handler is illustrated generally at 362 and defines an initial state 404 from which the microprocessor 12 begins execution. The Timekeeping Interrupt Handler 362 is invoked on an interrupt basis every time the CPE system clock 188 is incremented by one second. In this way, the Timekeeping Interrupt Handler 362 determines if any event has occurred that would dictate that the CPE 10 call the SPCS 36. There are four classes of event that dictate such a call.

The first class of events corresponds to the arrival of a specified date and time. Block 406 directs the microprocessor 12 to compare the system clock 188 to the five MDP polling times 274, 276, 278, 280, 282 and to the reminder times 250 for CRC data packets 344 by block 408, and to the next FSU poll time 322 by block 410. If a match is found, then blocks 412, 414, 416 respectively direct the microprocessor 12 to set the originating session indicator 221 in the MDP flag 220, the CRC flag 224, or the FSU flag 228. Thus, the CPE is operable to perform the step transmitting an information request message at a predefined time.

The second class of events corresponds to an event in which the CPE 10 checks whether a response to a previously transmitted page has been received at a server. When such a page was originally sent, the microprocessor 12 was directed (not shown) to initialize the SPP initial delay is timer 194 with the initial poll delay 294 configured in FLASH 18. Block 418 directs the microprocessor 12 to detect when the SPP initial delay timer 194 has expired and hence when an SPP session should be commenced. If such a condition is detected, then block 420 directs the microprocessor 12 to set the originating session indicator 221 in the SPP flag 222.

The third class of events corresponds to the arrival at the CPE 10 of a telephone call from a telephone number previously stored by the user as CLID data 351 in the user data block 268 of the FLASH 18. Block 422 directs the microprocessor 12 to compare any new data in the CLID buffer 180 to the data stored in the CLID data 351 section of FLASH 18. If a match is detected, then block 424 directs the microprocessor 12 to set the originating session indicator 221 in the IRN flag 226. Thus, the CPE performs the step of transmitting the information request message in response to CLID information.

The fourth class of events corresponds to the expiry of a timer 196, 200, 204, 198, 202, 206 delaying respectively an MDP, CRC, FSU, SPP, IRN, or MSR retry session or the expiry of a timer 208, 210, 212, 214, 216, 218 delaying respectively an MDP, CRC, FSU, SPP, IRN, or MSR backup session. If such a retry expiry is respectively detected by blocks 426, 430, 434, 428, 432, 436 or such a backup expiry is respectively detected by blocks 438, 440, 442, 444, 446, 448, then blocks 450, 452, 454, 456, 458, 460, 462, 464, 466, 468, 470, 472 respectively direct the microprocessor 12 to set the retry session indicator 223 in the MDP, CRC, FSU, SPP, IRN, MSR flags 220, 224, 228, 222, 226, 230 or to set the backup session indicator 225 in the MDP, CRC, FSU, SPP, IRN, MSR flags 220, 224, 228, 222, 226, 230. This, the CPE is directed to perform the step of transmitting the information request message at predefined intervals.

Finally, block 474 directs the microprocessor 12 to terminate the Timekeeping Interrupt Handler 362.

FIG. 15

Figure 15:
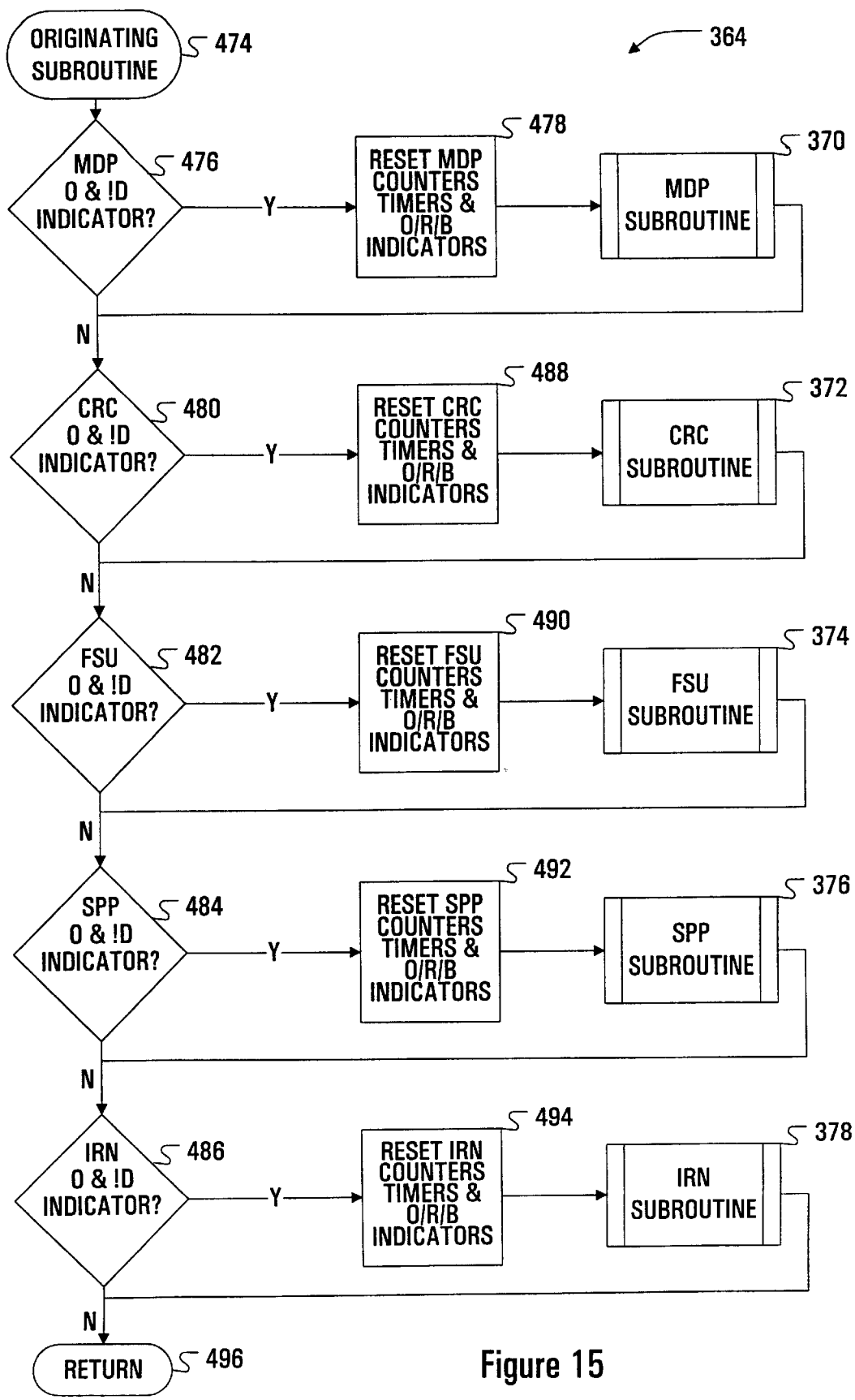
FIG. 15 is a flowchart of an Originating Subroutine encoded in the ROM as illustrated in FIG. 10.

With reference to FIGS. 1, 9 and 15, the Originating Subroutine 364 is illustrated generally at 364 and defines an initial state 474 from which the microprocessor 12 begins execution. The Originating Subroutine 364 invokes an appropriate originating session after analyzing the originating indicator 221 and the disabled indicator 227 of the set of session flags 220, 222, 224, 226, 228.

Block 476 directs the microprocessor 12 to determine whether the originating session indicator 221 in the MDP flag 220 has been set and the disabled indicator 227 is clear. If so, then block 478 directs the microprocessor 12 to clear the MDP retry and backup counters 232, 244, clear the MDP retry and backup timers 196, 208, and to clear in the MDP flag 220 the originating session indicator 221, the retry session indicator 223, and the backup session indicator 225. Thereafter, the microprocessor 12 is directed to commence the MDP Subroutine 370.

Similarly blocks 490, 482, 484, and 486 direct the microprocessor 12 to determine whether the originating session indicator 221 in respectively the CRC, FSU, SPP, and IRN flags 224, 228, 222, 226 have been set and the disabled indicator 227 is clear. If so, then blocks 488, 490, 492, 494 respectively direct the microprocessor 12 to clear the CRC counters 236, 248, timers 200, 212, and flag's 224 originating 221, retry 223, and backup 225 indicators, to clear the FSU counters 216, 252, timers 204, 216, and flags 228 including originating 221, retry 223, and backup indicators 225, to clear the SPP counters 234, 246, timers 198, 210, and flags 222 including originating 221, retry 223, and backup 225 indicators, and to clear the IRN counters 238, 250, timers 202, 214, and flag's 226 originating 221, retry 223, and backup 225 indicators. The microprocessor 12 is then respectively directed to commence the CRC Subroutine 372, the FSU Subroutine 374, the SPP Subroutine 376, or the IRN Subroutine 378.

Finally, block 496 directs the microprocessor 12 to return from the Originating Subroutine 364.

FIG. 16

Figure 16:
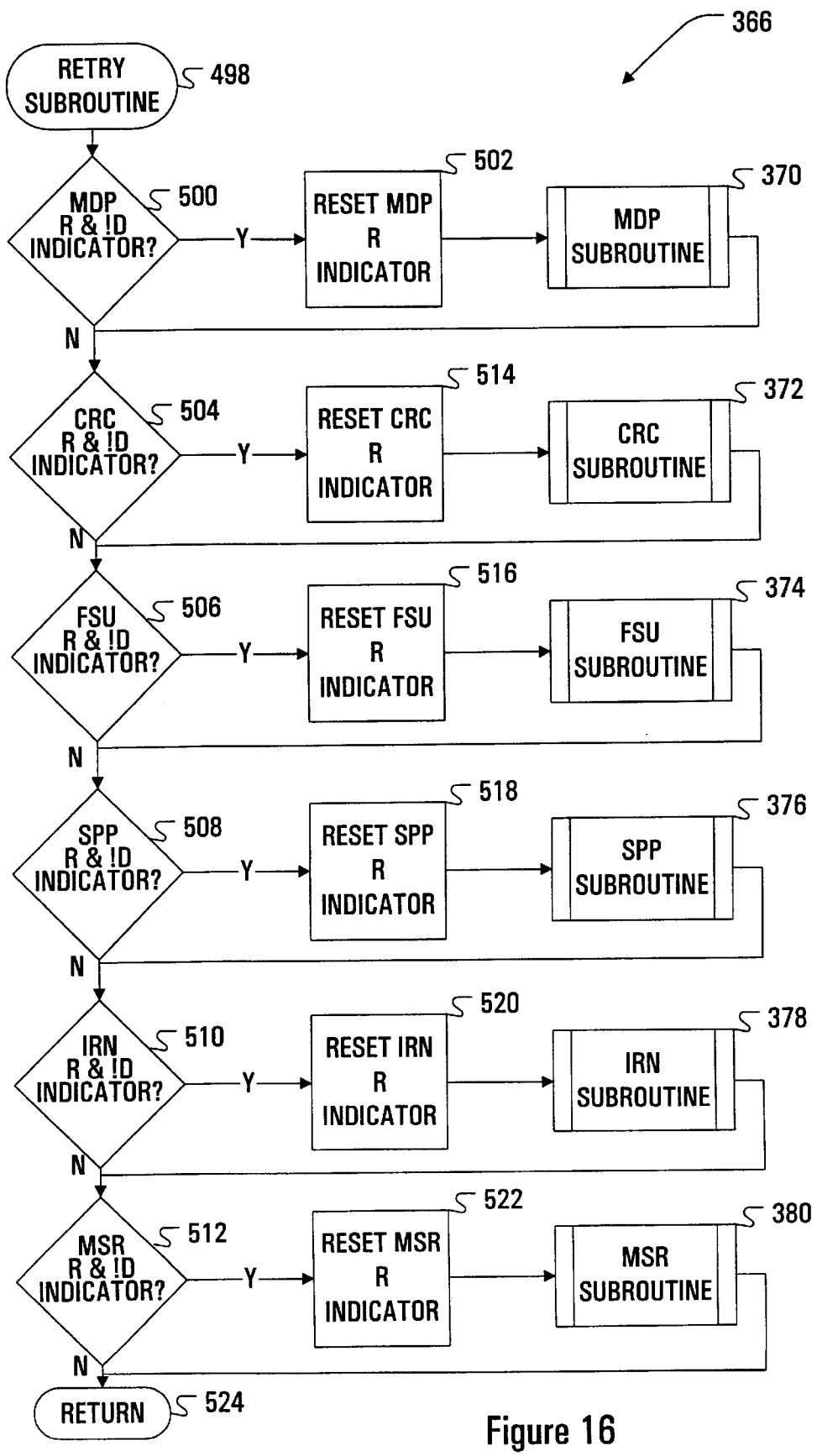
FIG. 16 is a flowchart of a Retry Subroutine encoded in the ROM as illustrated in FIG. 11.

With reference to FIGS. 1, 9 and 16, the Retry Subroutine is illustrated generally at 366 and defines an initial state 498 from which the microprocessor 12 begins execution. The Retry Subroutine 366 invokes an appropriate retry session after analyzing the retry indicator 223 and the disabled indicator 227 of the set of session flags 220, 222, 224, 226, 228.

Block 500 directs the microprocessor 12 to determine whether the retry session indicator 223 in the MDP flag 220 has been set and the disabled indicator 227 is clear. If so, then block 502 directs the microprocessor 12 to clear the retry session indicator 223 in the MDP flag 220.

Thereafter, the microprocessor 12 is directed to commence the MDP Subroutine 370.

Similarly blocks 504, 506, 508, 510, and 512 direct the microprocessor 12 to determine whether the retry session indicator 223 in respectively the CRC, FSU, SPP, IRN, or MSR flags 224, 228, 222, 226, 230 has been set and the disabled indicator 227 is clear. If so, then blocks 514, 516, 518, 520, 522 respectively direct the microprocessor 12 to clear the retry session indicator 223 in the CRC, FSU, SPP, IRN, or MSR flags 224, 228, 222, 226, 230. The microprocessor 12 is then respectively directed to commence the CRC Subroutine 372, the FSU Subroutine 374, the SPP Subroutine 376, the IRN Subroutine 378, or the MSR Subroutine 380.

Finally, block 524 directs the microprocessor 12 to return from the Retry Subroutine 466.

FIG. 17

Figure 17:
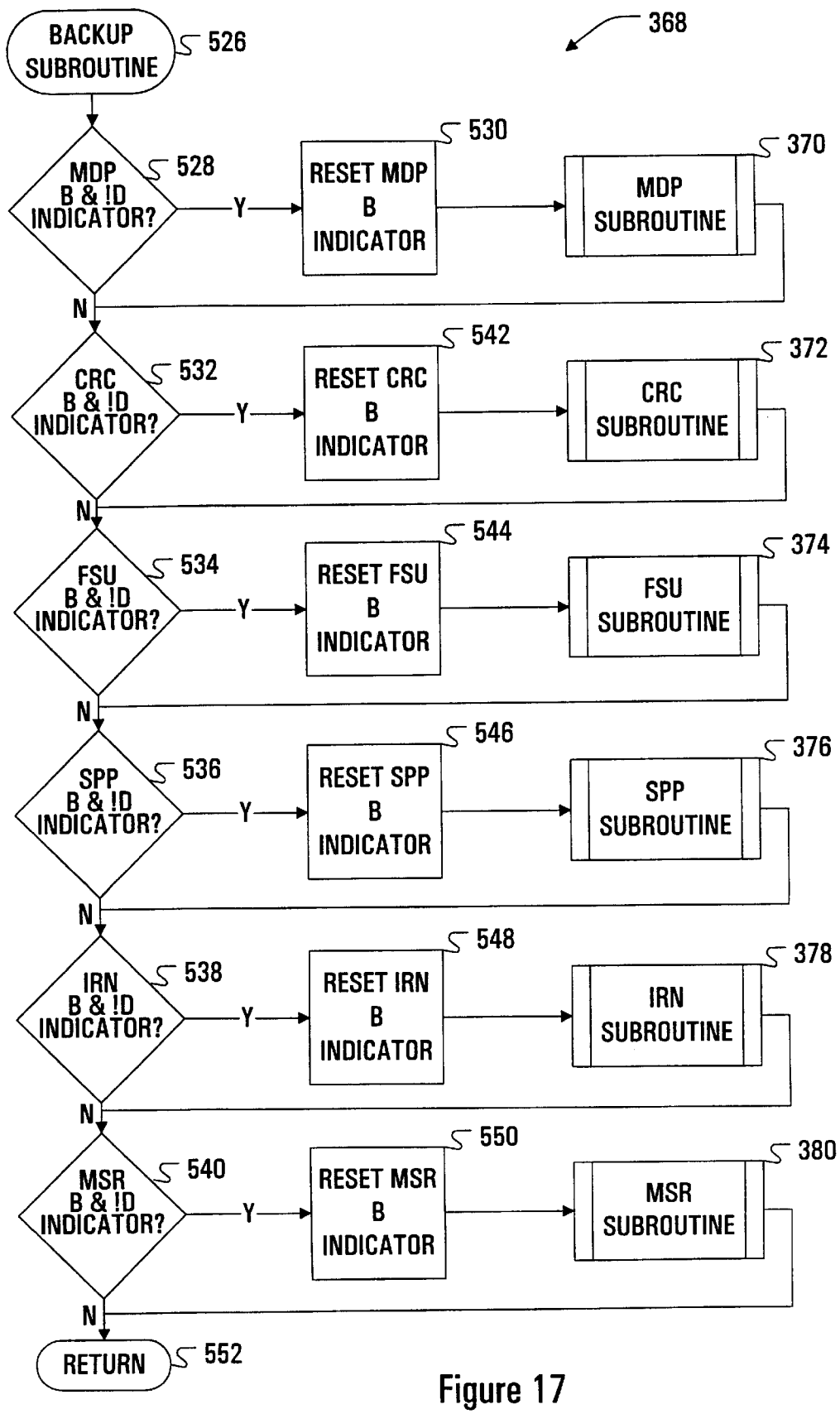
FIG. 17 is a flowchart of a Backup Subroutine encoded in the ROM as illustrated in FIG. 11.
Figure 18A:
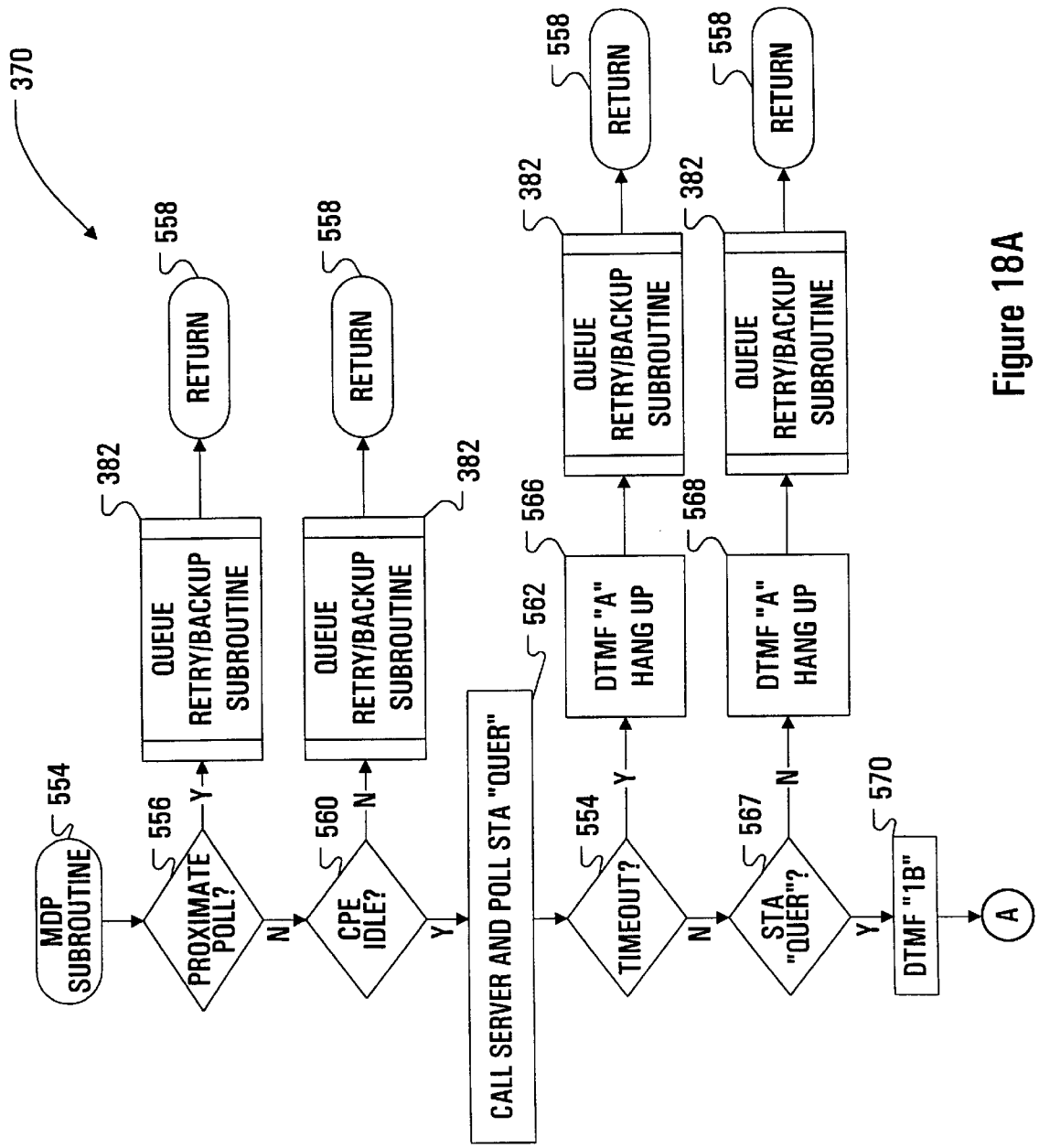
FIG. 18A and B are a flowchart of an MDP Subroutine encoded in the ROM as illustrated in FIG. 11.
Figure 18B:
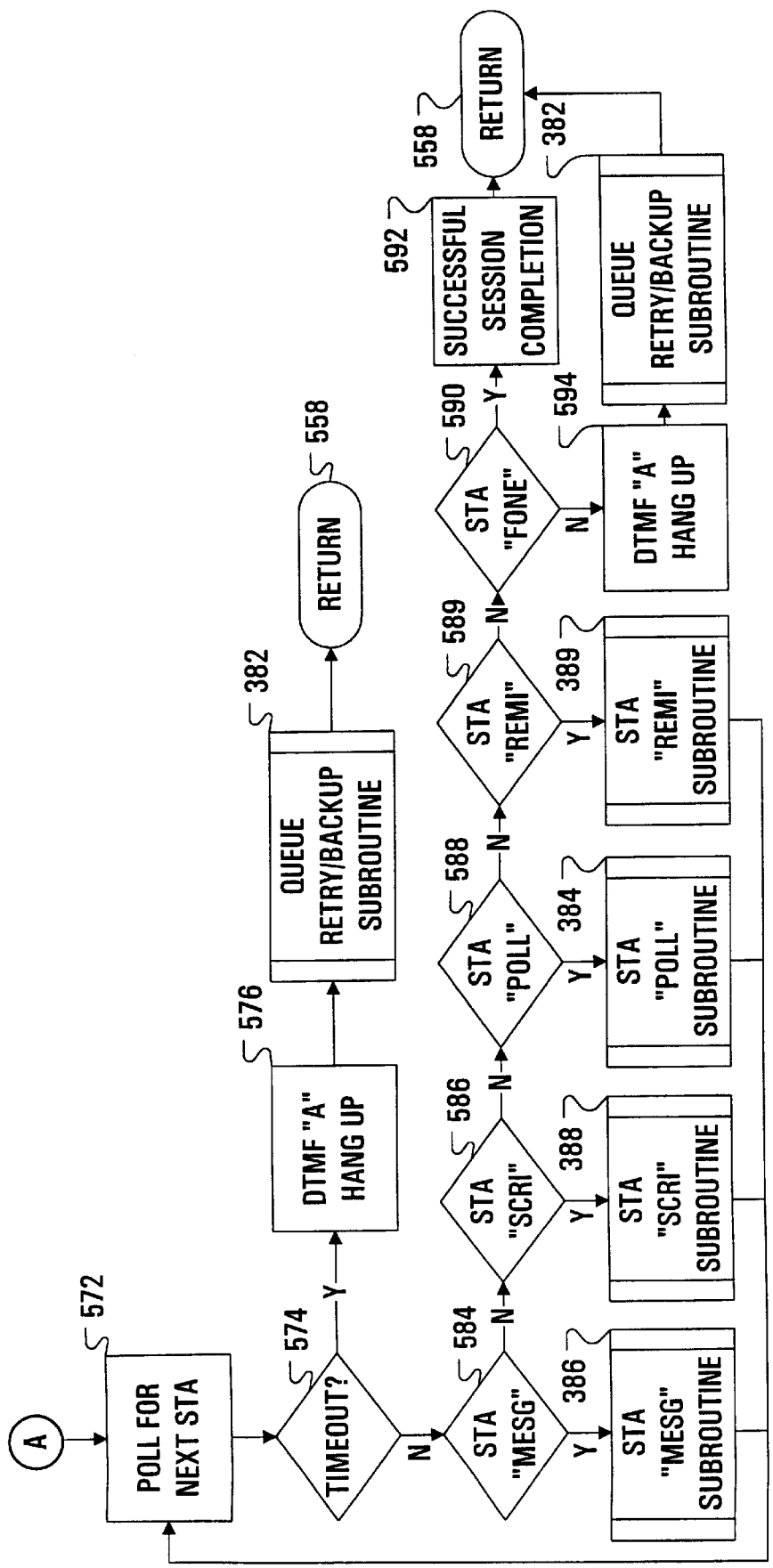
Figure 19:
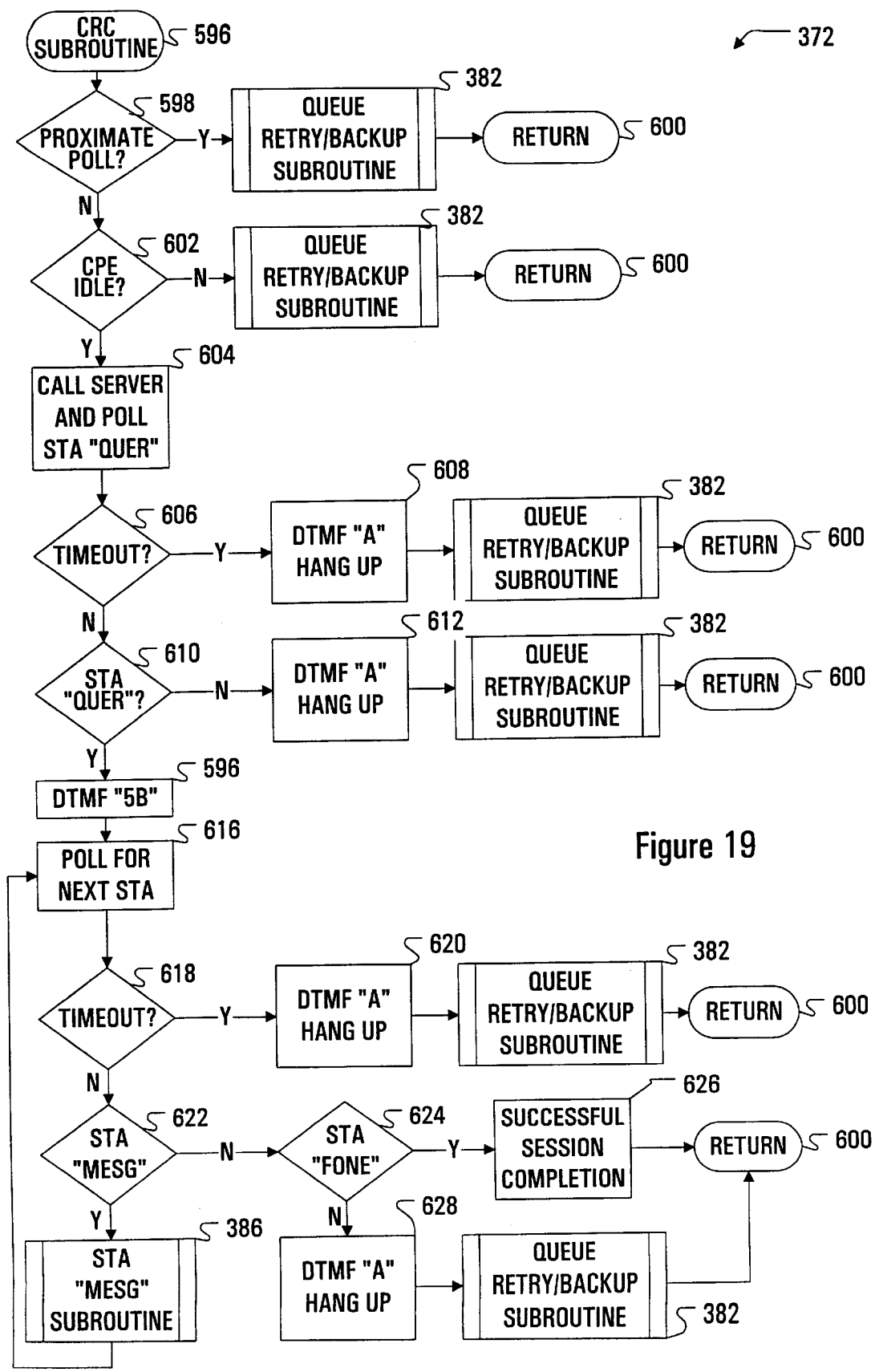
FIG. 19 is a flowchart of a CRC Subroutine encoded in the ROM as illustrated in FIG. 11.
Figure 20:
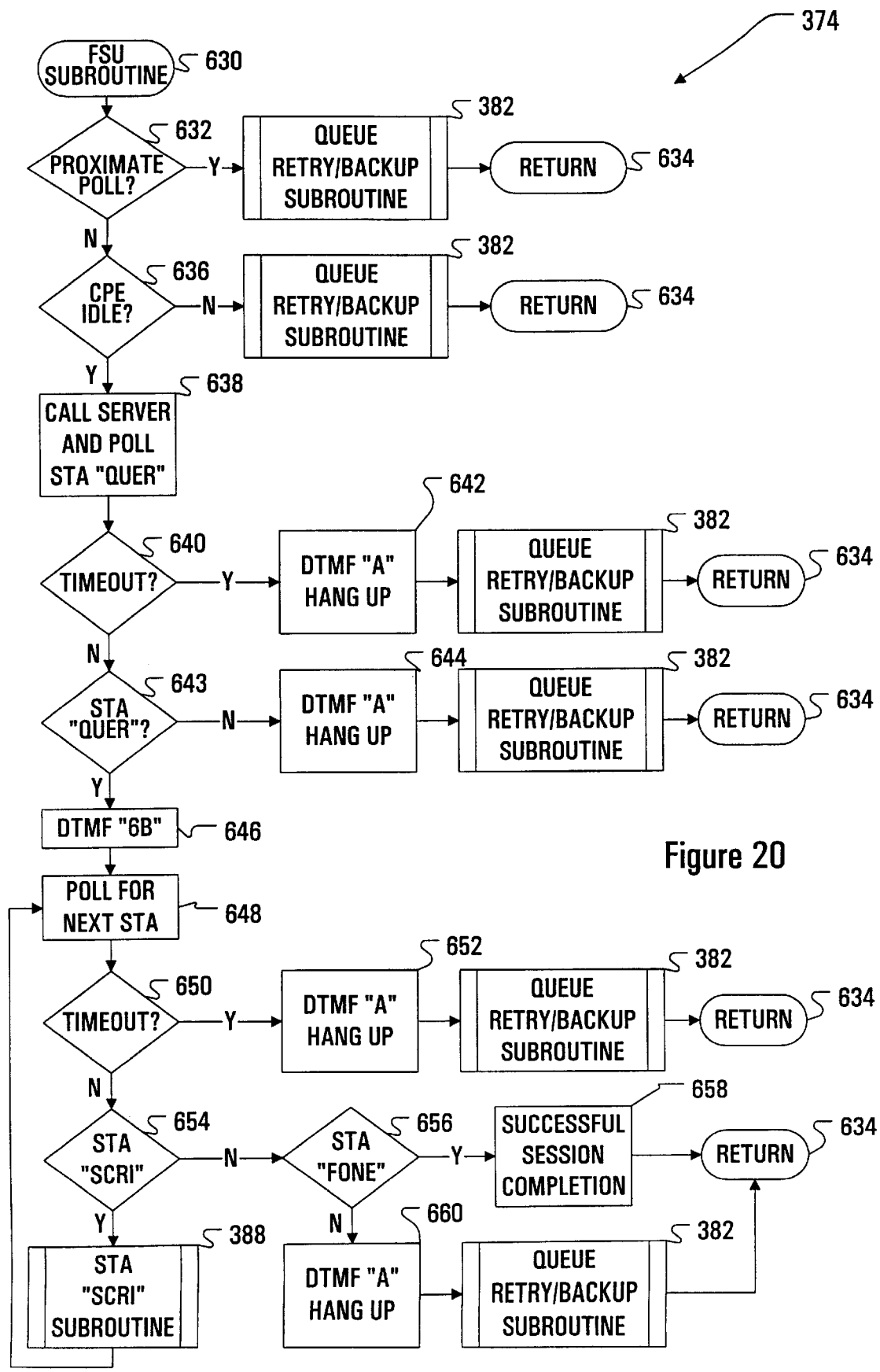
FIG. 20 is a flowchart of an FSU Subroutine encoded in the ROM as illustrated in FIG. 11.
Figure 21:
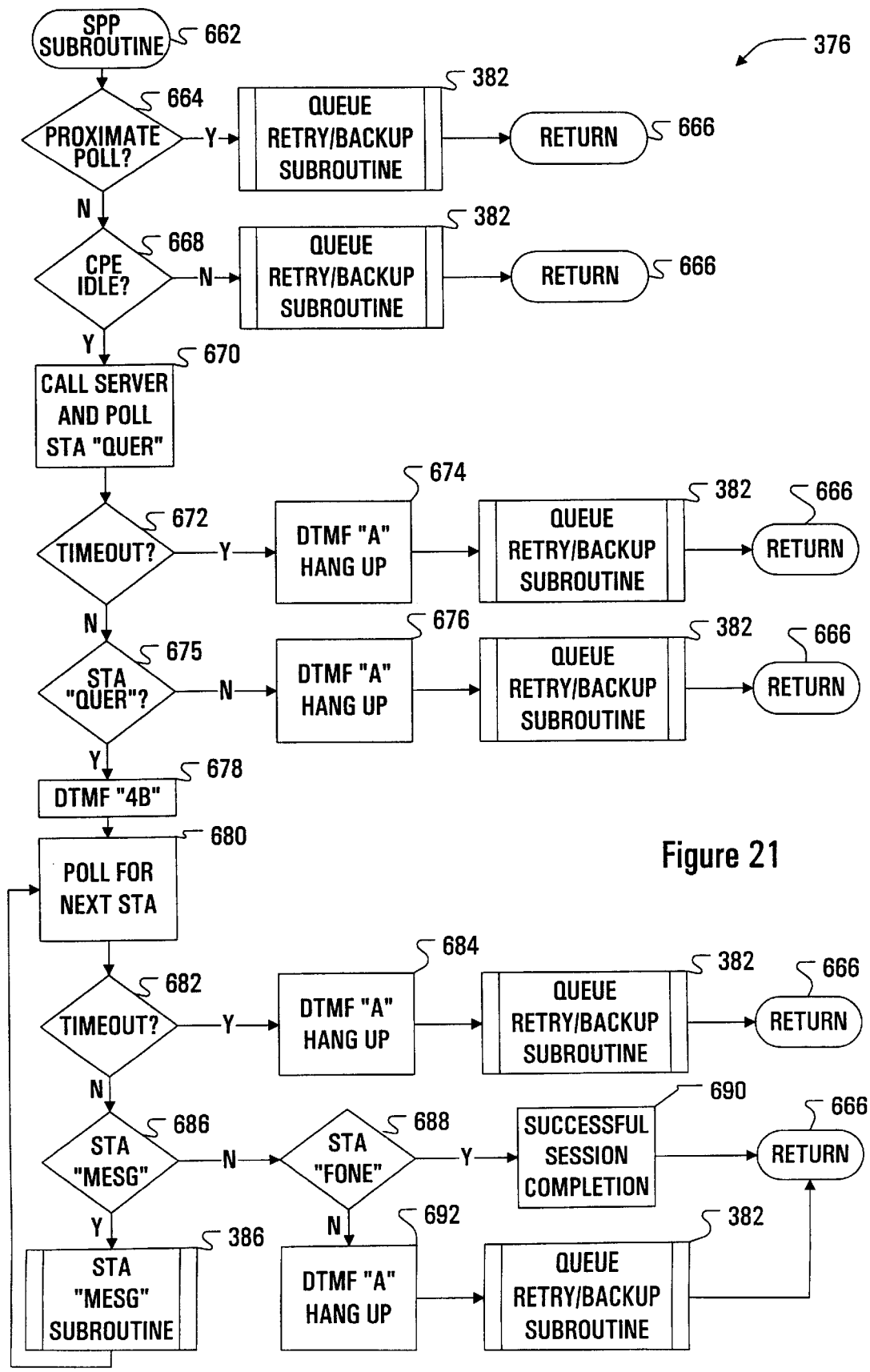
FIG. 21 is a flowchart of an SPP Subroutine encoded in the ROM as illustrated in FIG. 11.
Figure 22:
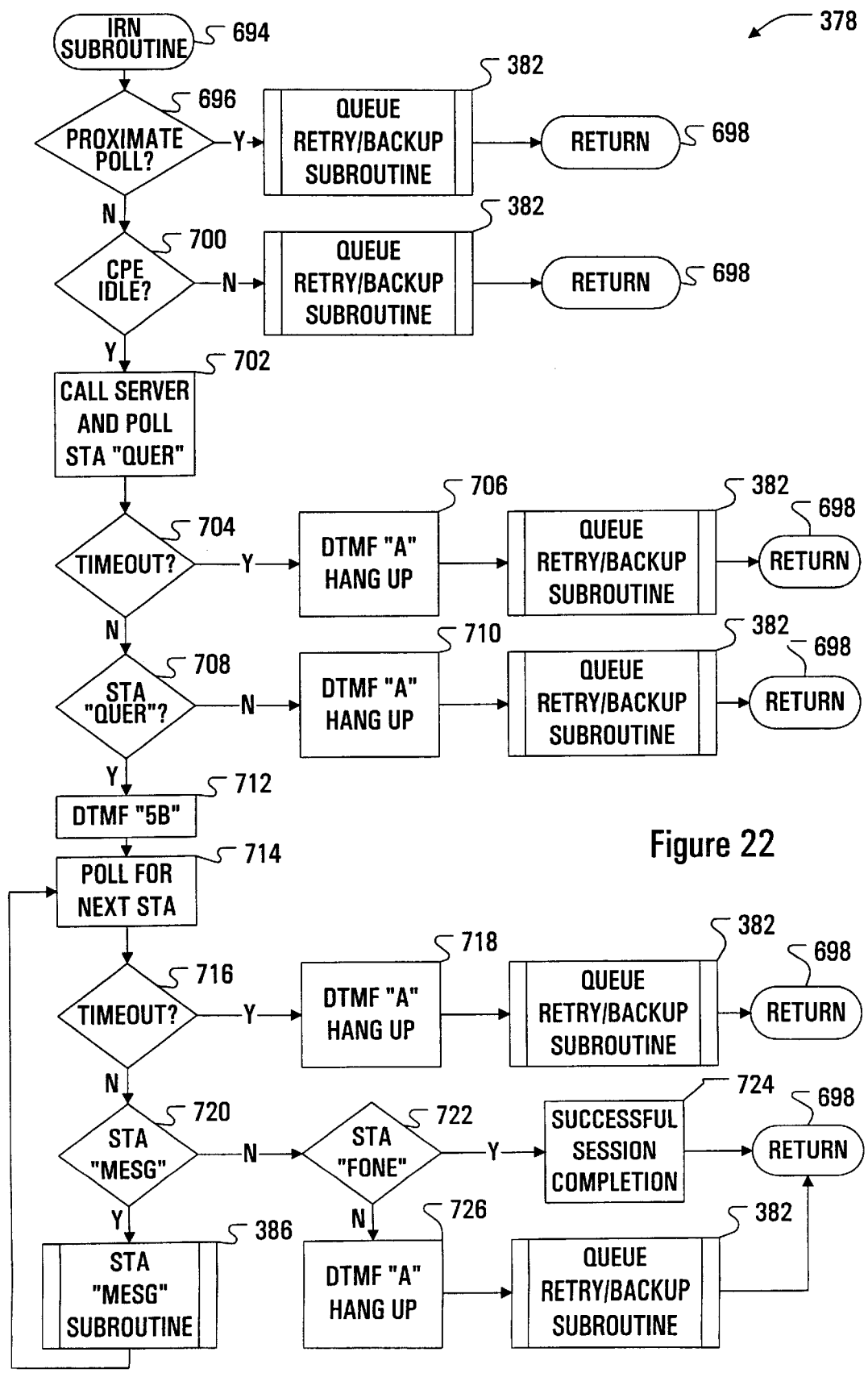
FIG. 22 is a flowchart of an IRN Subroutine encoded in the ROM as illustrated in FIG. 11.
Figure 23:
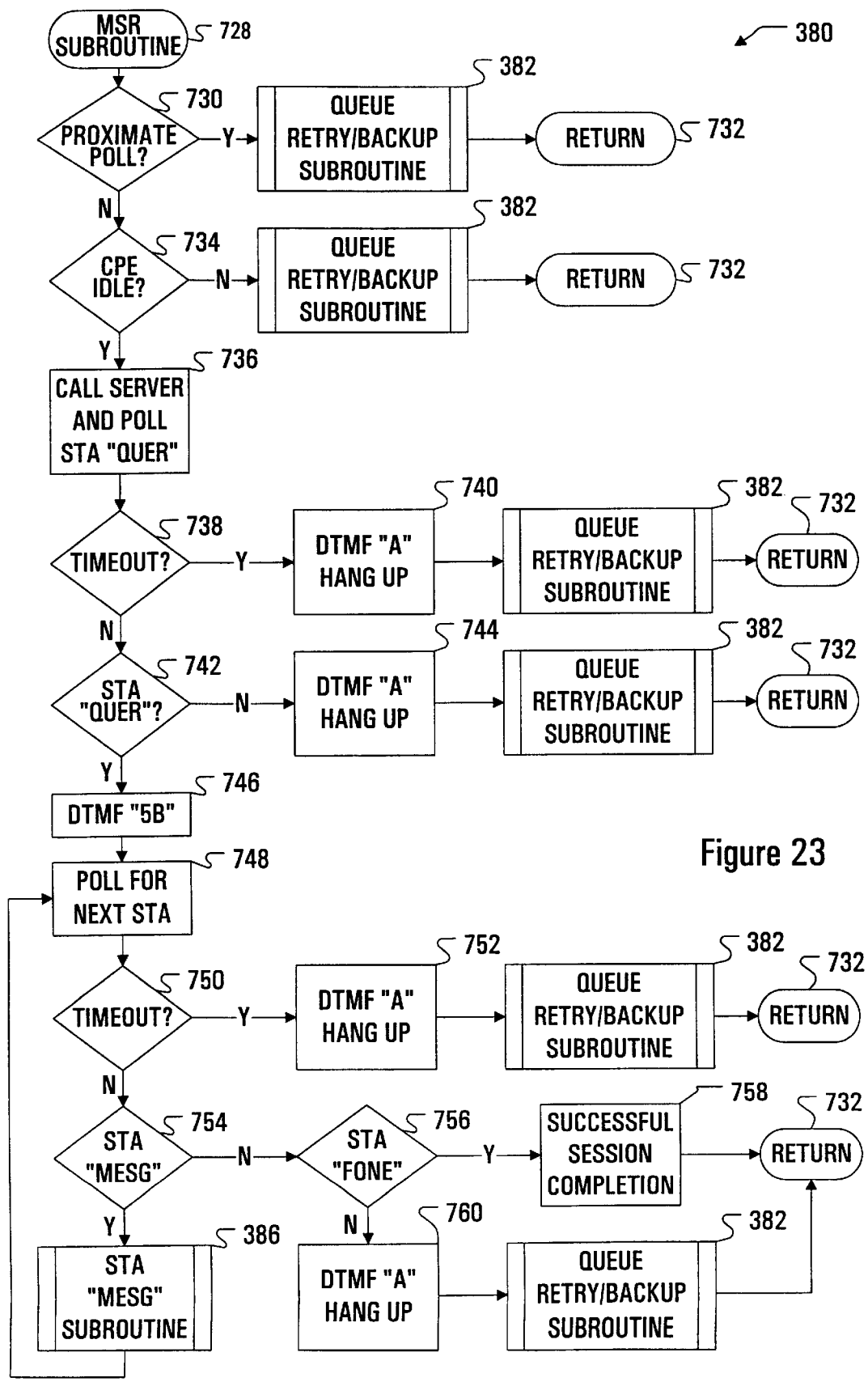
FIG. 23 is a flowchart of an MSR Subroutine encoded in the ROM as illustrated in FIG. 11.
Figure 24:
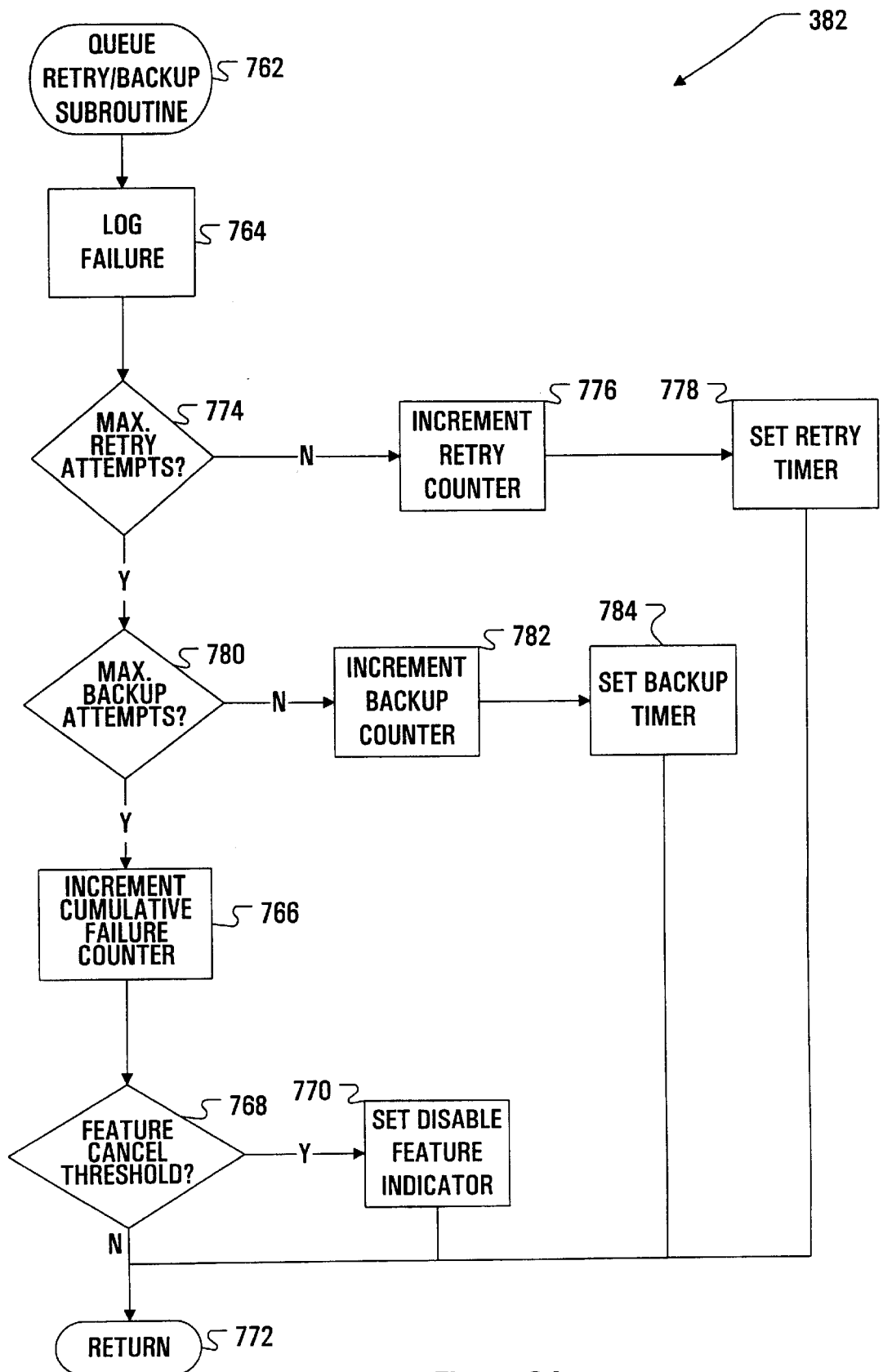
FIG. 24 is a flowchart of a Queue Retry/Backup Subroutine encoded in the ROM as illustrated in FIG. 11.
Figure 25A:
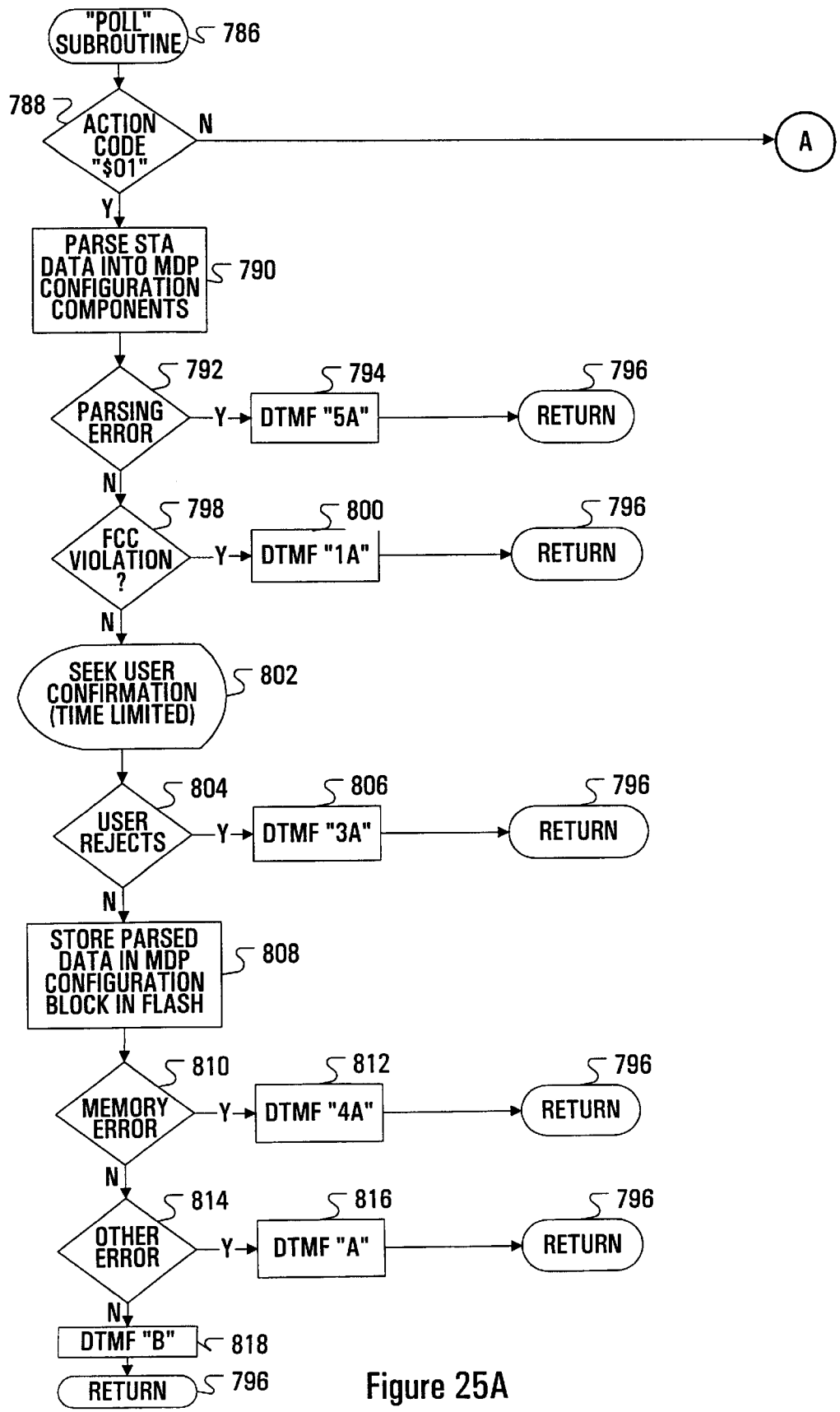
FIG. 25A and B are a flowchart of a POLL Subroutine encoded in the ROM as illustrated in FIG. 11.
Figure 25B:
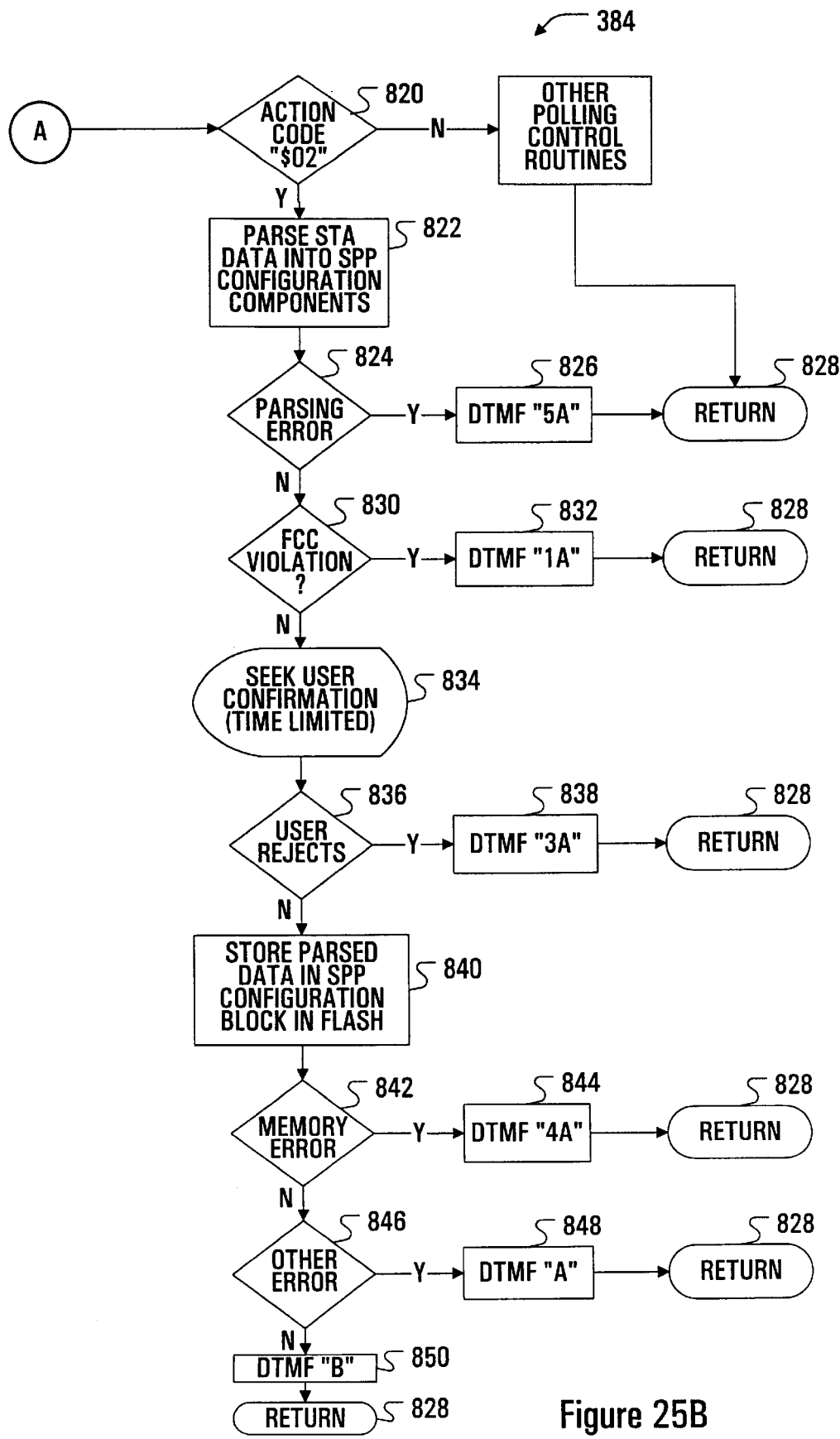
Figure 26:
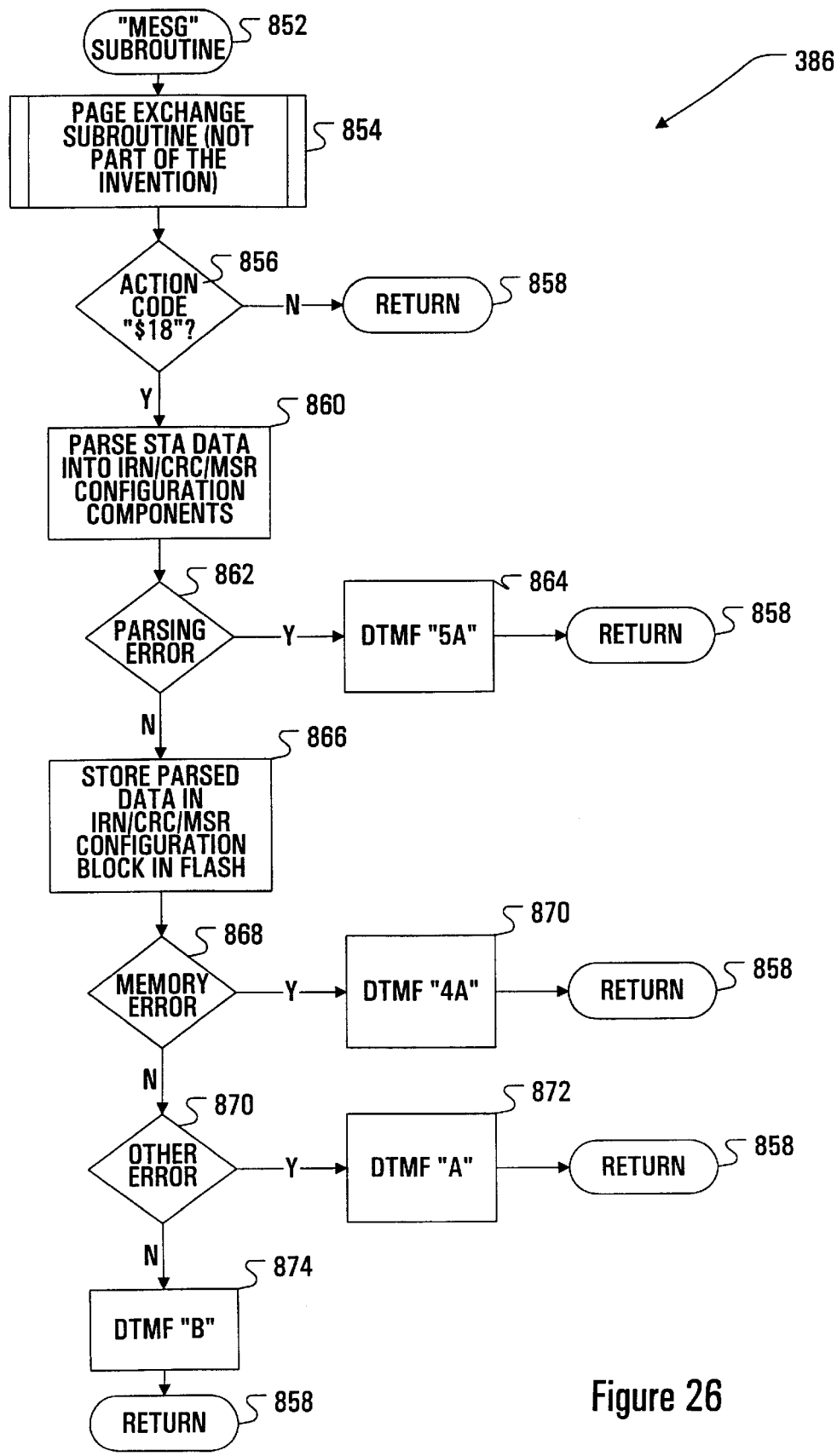
FIG. 26 is a flowchart of an MESG Subroutine encoded in the ROM as illustrated in FIG. 11.
Figure 27A:
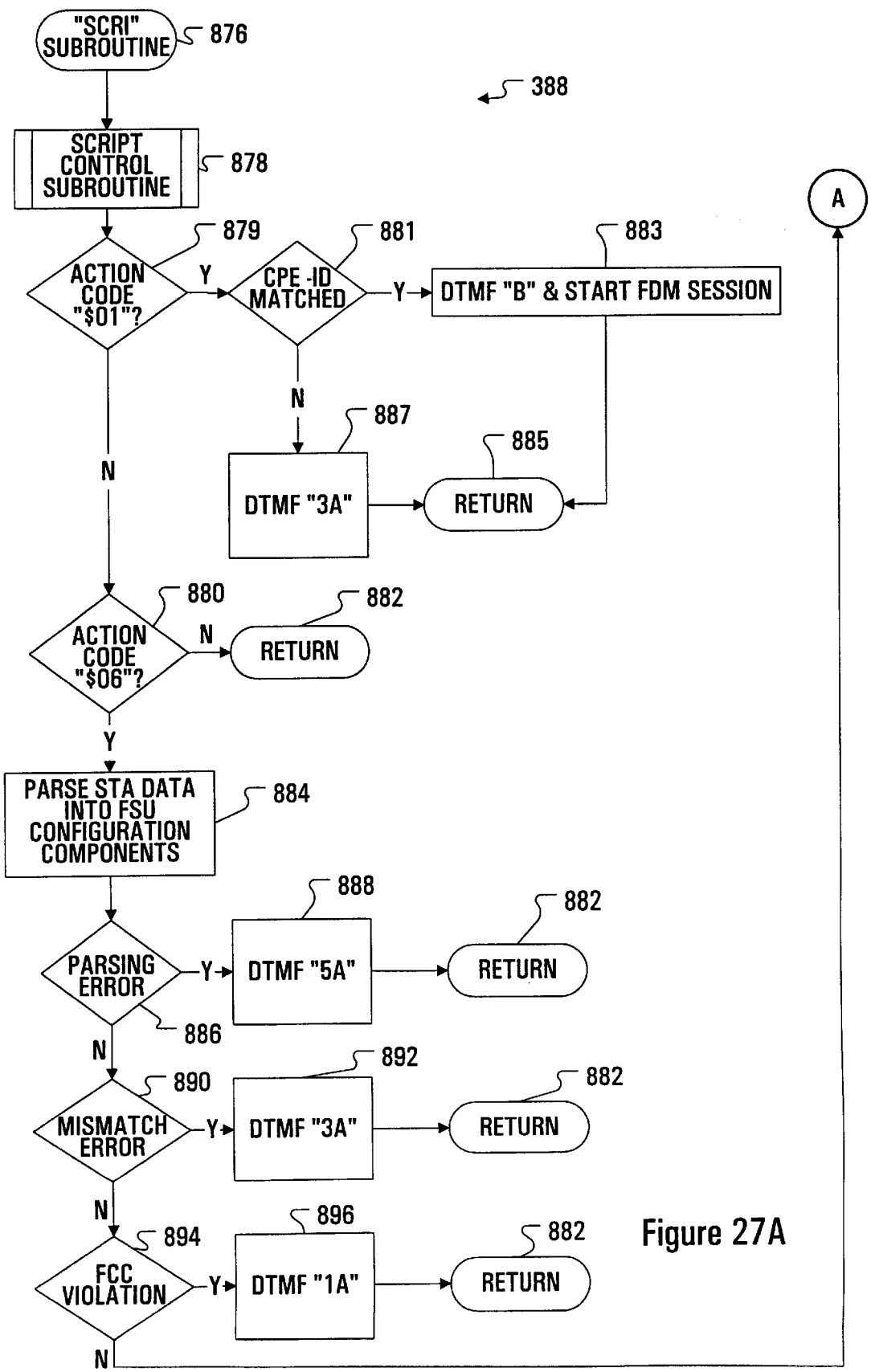
FIG. 27A and B are a flowchart of an SCRI Subroutine encoded in the ROM as illustrated in FIG. 11.
Figure 27B:
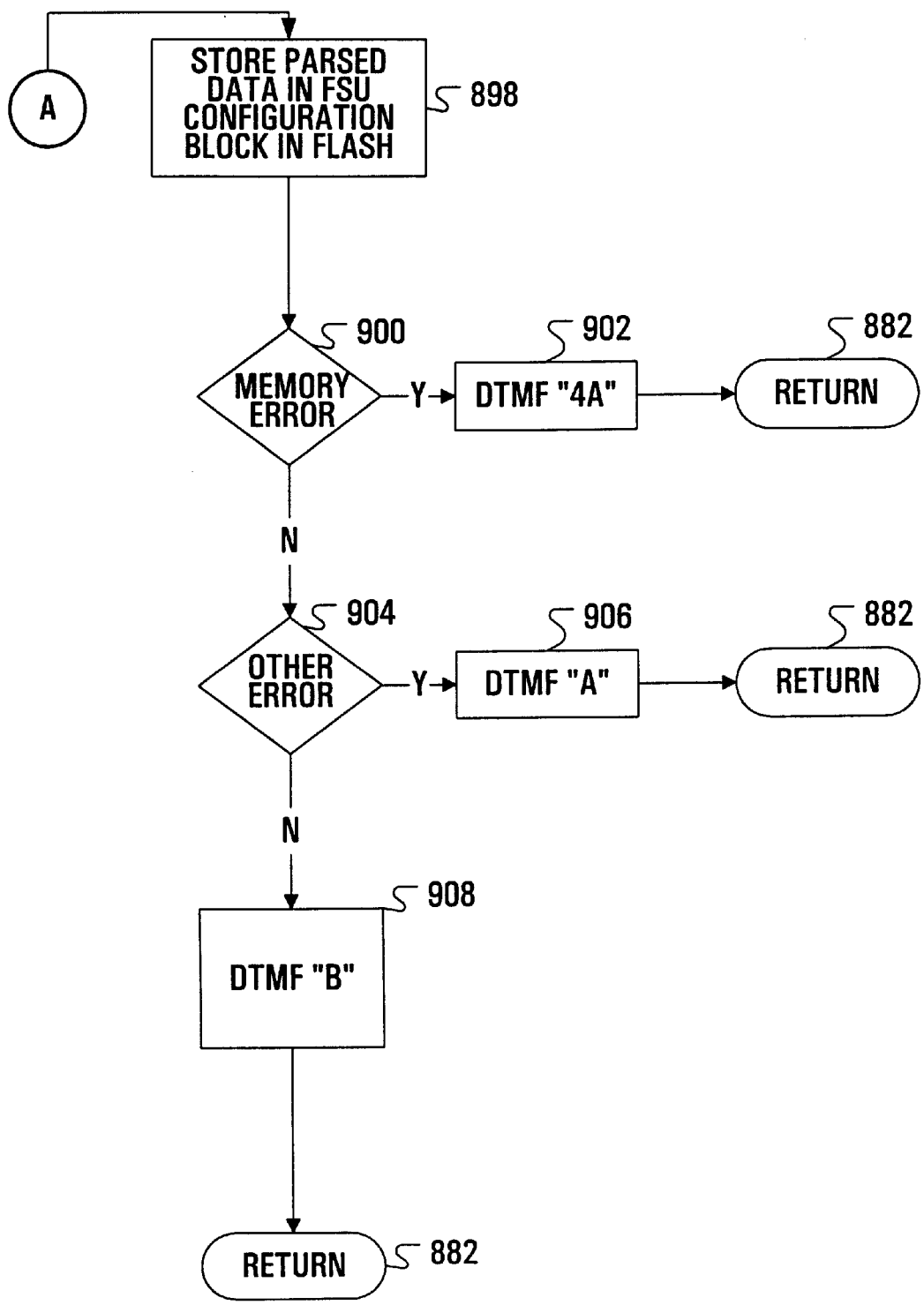
Figure 28:
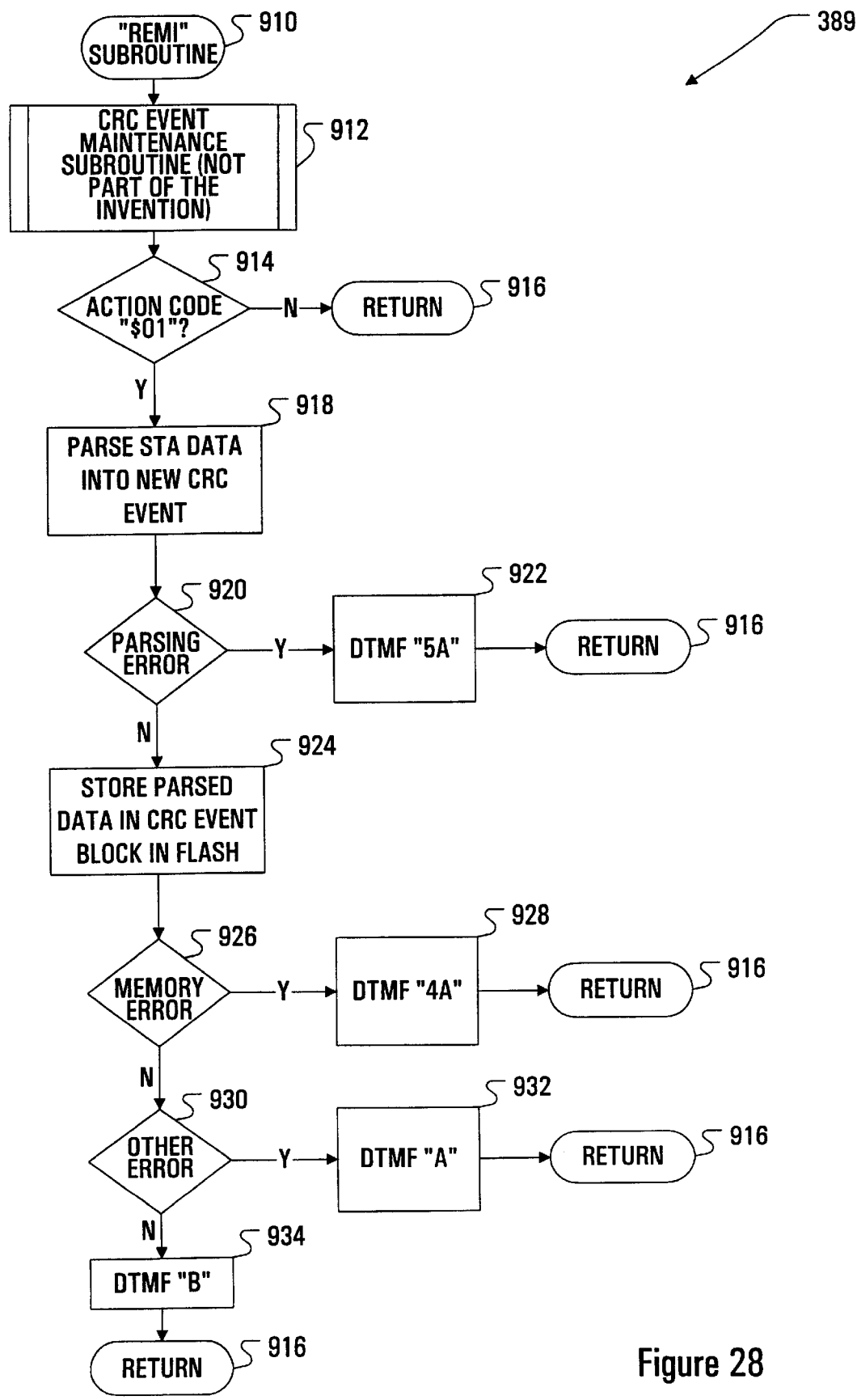
FIG. 28 is a flowchart of an REMI Subroutine encoded in the ROM as illustrated in FIG. 11.

With reference to FIGS. 1, 9 and 17, the Backup Subroutine is illustrated generally at 368 and defines an initial state 526 from which the microprocessor 12 begins execution. The Backup Subroutine 368 directs the CPE 10 to call a backup SPCS 36 if it has experienced repeated failures in establishing a connection with the primary SPCS 36. In other words, the Backup Subroutine 368 invokes an appropriate backup session after analyzing the backup indicator 225 and the disabled indicator 227 of the set of session flags 220, 222, 224, 226, 228.

Block 528 directs the microprocessor 12 to determine whether the backup session indicator 225 in the MDP flag 220 has been set and the disabled indicator is clear 227. If so, then block 530 directs the microprocessor 12 to clear in the MDP flag 220 the backup session indicator 225.

Thereafter, the microprocessor 12 is directed to commence the MDP Subroutine 370.

Similarly blocks 532, 534, 536, 538, 540 direct the microprocessor 12 to determine whether the backup session indicator 225 in respectively the CRC, FSU, SPP, IRN, or MSR flags 224, 228, 222, 226, 230 has been set and the disabled indicator is clear 227. If so, then blocks 542, 544, 546, 548, 550 respectively direct the microprocessor 12 to clear the backup session indicator 225 in the CRC, FSU, SUP, IRN, or MSR flags 224, 228, 222, 226, 230. The microprocessor 12 is then respectively directed to commence the CRC Subroutine 372, the FSU Subroutine 374, the SPP Subroutine 376, the IRN Subroutine 378, or the MSR Subroutine 380.

Finally, block 552 directs the microprocessor 12 to return from the Backup Subroutine 368.

FIG. 18

With reference to FIGS. 1, 2, 9, 10 and 18, the MDP Subroutine is generally illustrated at 370 and defines an initial state 554 from which the microprocessor 12 begins execution. The MDP Subroutine 370 initiates and controls any MDP session.

Block 556 directs the microprocessor 12 to evaluate the polling timers 194, 196, 198, 200, 202, 204, 206, 208, 210, 212, 214, 216, 218 and to evaluate the difference between the CPE System Clock time 188 and the polling calendars 274, 276, 278, 280, 282, 322, 350 to determine whether any such value is below the poll proximity threshold 327. If so, then other autonomous calls are scheduled to begin soon and the microprocessor 12 is directed to avoid a scheduling conflict by aborting the current MDP poll in favour of queuing a retry/backup poll session via the Queue Retry/Backup Subroutine 382 before directing the microprocessor 12 to return from the MDP Subroutine 370.

Alternatively, if no other autonomous call is proximate, block 560 directs the microprocessor 12 to evaluate the CPE idle timer 190 to determine if the CPE 10 has been idle sufficiently long in comparison to the CPE idle time threshold 328 that an autonomous calling session would not be likely to disturb the user who might be using the CPE 10 for conventional telephone purposes. If the CPE 10 has not been sufficiently idle, then the microprocessor 12 is directed to abort the current MDP poll in favor of queuing a retry/backup poll session via the Queue Retry/Backup Subroutine 382 before directing the microprocessor 12 to return from the MDP Subroutine 370.

Alternatively, if the CPR 10 has been sufficiently idle, then block 562 directs the CPE 10 to call the SPCS 36 to initiate a standard ADSI SDC session, to display the MDP display message 288 on the CPE display 25, and to poll the received data queue 185 for ADSI messages. If the MDP Subroutine 370 has been called from by the Originating Subroutine 364 or the Retry Subroutine 366, then the CPE 10 calls the primary message server telephone number 270. Alternatively, if the MDP Subroutine 370 has been called by the Backup Subroutine 368, then the CPE 10 calls the backup message server telephone number 272. Thus, at least one alternating telephone number is dialled when the first predefined telephone number is unavailable. Either way, the CPE 10 polls the received data queue 185 for an ADSI STA 151d QUER $81 message 68 from the SPCS 36 so that it can state to the SPCS 36 the purpose of its call.

If the microprocessor 12 determines, under the direction of block 564, that the CPE 10 has not received a message from the SPCS 36 within the call time-out threshold 329, then block 566 directs the microprocessor 12 to cause a DTMF "A" to be transmitted to indicate to the SPCS 36 that an unspecified error has occurred and then to cause the CPE 10 to hang up the line 30 and to abort the current MDP poll in favor of queuing a retry/backup poll session via the Queue Retry/Backup Subroutine 382 before directing the microprocessor 12 to return from the MDP Subroutine 370.

Alternatively, it at block 564 the CPE 10 does receive a message from the SPCS 36 within the call time-out threshold 329, then block 567 directs the microprocessor 12 to determine if the message is an ADSI STA 151d QUER $81 message 68. If not, then block 568 directs the microprocessor 12 to cause a DTMF "A" to be transmitted to the SPCS 36 to indicate an unspecified error has occurred and to cause the CPE 10 to hang up the line 30, after which the microprocessor 12 is directed to abort the current MDP poll in favor of queuing a retry/backup poll session via the Queue Retry/Backup Subroutine 382 before directing the microprocessor 12 to return from the MDP Subroutine 370.

Alternatively, if at block 567 the CPE 10 has received an ADSI STA 151d QUER $81 message from the SPCS 36, then block 570 directs the microprocessor 12 to cause the CPR 10 to transmit a DTMF "1B" to the SPCS 36 to indicate that the call is a CPE 10 initiated daily poll. This indication helps the SPCS 36 decide which ADSI instructions to transmit to the CPE 10.

Block 572 directs the CPE 10 to poll for further messages from the SPCS 36. If the microprocessor 12 determines under the direction of block 574 that the CPE 10 has not received a message from the SPCS 36 within the call time-out threshold 329, then block 576 directs the microprocessor 12 to cause a DTMF "A" signal to be transmitted to indicate to the SPCS 36 that an unspecified error has occurred and then to cause the CPE 10 to hang up the line 30 and to abort the current MDP poll in favor of queuing a retry/backup poll session via the Queue Retry/Backup Subroutine 382 before directing the microprocessor 12 to return from the MDP Subroutine 370.

Alternatively if at block 574, the CPE 10 receives a message from the SPCS 36, then blocks 584, 586, 588, 589, 590 respectively direct the microprocessor 12 to examine the application name bytes 46, 48, 50, 52 to determine if the message is an ADSI STA 151d MESG message 56, an ADSI STA 151d SCRI message 58, an ADSI STA 151d POLL message 60, an ADSI STA 151d REMI message 61 or an ATSI STA 151d FONE 55 message.

If at block 584 the message is an ADSI STA 151d MESG message 56, then the microprocessor 12 is directed to the MESG subroutine 386, upon return from which, the microprocessor 12 is directed back to block 572 to await further messages from the SPCS 36.

Alternatively, if at block 586 the message is an ADSI STA 151d SCRI message 58, then the microprocessor 12 is directed to the SCRI subroutine 386, upon return from which, the microprocessor 12 is directed back to block 572 to await further messages from the SPCS 36.

Alternatively, if at block 588 the message is an ADSI STA 151d POLL message 60, then the microprocessor 12 is directed to the POLL subroutine 386, upon return from which, the microprocessor 12 is directed back to block 572 to await further messages from the SPCS 36.

Alternatively, if at block 589 the message is an ADSI STA 151d REMI message 61, then the microprocessor 12 is directed to the REMI subroutine 389, upon return from which, the microprocessor 12 is directed back to block 572 to await further messages from the SPCS 36.

Alternatively, if at block 590 the message is an ADSI STA 151d FONE $01 message 69 (the microprocessor 12 being directed to examine as well the message's action code byte 62), then the microprocessor 12 is directed by block 592: to cause a DTMF "B" to be transmitted to the SPCS 36 to indicate successful completion of the call, to cause the CPE 10 to hang up the line 30, and to clear all MDP flag indicators 220, counters 232, 244, 332 and timers 196, 208. Thereafter, the microprocessor 12 is directed to return from the MDP Subroutine 370.

Alternatively, if the message does not match, then block 594 directs the microprocessor 12 to cause a DTMF "A" signal to be transmitted to the SPCS 36 to indicate an unspecified error has occurred and to cause the CPE 10 to hang up the line 30 whereafter the CPE 10 will ignore all further ADSI messages. Thereafter, the microprocessor 12 is directed to abort the current MDP poll in favor of queuing a retry/backup poll session via the Queue Retry/Backup Subroutine 382 before directing the microprocessor 12 to return from the MDP Subroutine 370.

FIG. 19

With reference to FIGS. 1, 2, 9, 10 and 19, the CRC Subroutine is generally illustrated at 372 and defines an initial state 596 from which the microprocessor 12 begins execution. The CRC Subroutine 372 initiates and controls any CRC session.

Block 598 directs the microprocessor 12 to evaluate the polling timers 194, 196, 198, 200, 202, 204, 206, 208, 210, 212, 214, 216, 218 and to evaluate the difference between the CPE System Clock time 188 and the polling calendars 274, 276, 278, 280, 282, 322, 350 to determine whether any such value is below the poll proximity threshold 327. If so, then the microprocessor 12 is directed to abort the current CRC poll in favor of queuing a retry/backup poll session via the Queue Retry/Backup Subroutine 382 before directing the microprocessor 12 to return from the CRC Subroutine 372.

Alternatively, if no other autonomous call is proximate, block 602 directs the microprocessor 12 to evaluate the CPE idle timer 190 to determine if the CPE 10 has been idle sufficiently long in comparison to the CPE idle time threshold 328 that an autonomous calling session would not disturb the user. If not, then the microprocessor 12 is directed to abort the current CRC poll in favor of queuing a retry/backup poll session via the Queue Retry/Backup Subroutine 382 before directing the microprocessor 12 to return from the CRC Routine 372.

Alternatively, if the CPE 10 has been sufficiently idle, then block 604 directs the CPE 10 to call the SPCS 36 to initiate a standard ADSI SDC session, to display the message sending display message 310 on the CPE display 25, and to poll the received data queue 185 for ADSI messages. If the CRC Subroutine 372 has been called from by the Originating Subroutine 364 or the Retry Subroutine 366, then the CPE 10 calls the primary message sending server telephone number 302. Alternatively, if the CRC Subroutine 372 has been called by the Backup Subroutine 368, then the CPE 10 calls the backup message sending server telephone number 304. Either way, the CPE 10 polls the received data queue 185 for an ADSI STA 151d QUER $81 message 68 from the SPCS 36 so that it can state to the SPCS 36 the purpose of its call.

If the microprocessor 12 determines, under the direction of block 606 that the CPE 10 has not received a message from the SPCS 36 within the call time-out threshold 329, then block 608 directs the microprocessor 12 to cause a DTMF "A" signal to be transmitted to indicate to the SPCS 36 that an unspecified error has occurred and then to cause the CPE 10 to hang up the line 30 and to abort the current CRC poll in favor of queuing a retry/backup poll session via the Queue Retry/Backup Subroutine 382 before directing the microprocessor 12 to return from the CRC Subroutine 372.

Alternatively, if at block 606 if the CPE 10 does receive a message from the SPCS 36 within the call time-out threshold 329 then block 610 directs the microprocessor 12 to determine if the message is an ADSI STA 151d QUER $81 message 68. If not, then block 612 directs the microprocessor 12 to cause a DTMF "A" to be transmitted to the SPCS 36 to indicate an unspecified error has occurred and to cause the CPE 10 to hang up the line 30, after which the microprocessor 12 is directed to abort the current CRC poll in favor of queuing a retry/backup poll session via the Queue Retry/Backup Subroutine 382 before directing the microprocessor 12 to return from the CRC Subroutine 372.

Alternatively, if at block 610 the CPE 10 has received an ADSI STA 151d QUER $81 message from the SPCS 36, then block 614 directs the microprocessor 12 to cause the CPE 10 to transmit a DTMF "5B" to the SPCS 36 to indicate that the call is a CPE 10 initiated message, and to send only/non-interactive poll.

Block 616 then directs the CPE 10 to poll for further messages from the SPCS 36. If the microprocessor 12 determines under the direction of block 618 that the CPE 10 has not received a message from the SPCS 36 within the call time-out threshold 329, then block 620 directs the microprocessor 12 to cause the CPE 10 to transmit a DTMF "A" and to hang up the line 30, and thereafter to abort the current CRC poll in favor of queuing a retry/backup poll session via the Queue Retry/Backup Subroutine 382 before directing the microprocessor 12 to return from the CRC Routine 372.

Alternatively, if at block 618 the CPE 10 receives a message from the SPCS 36, then blocks 622 and 624 respectively direct the microprocessor 12 to examine the message's application name bytes 46, 48, 50, 52 to determine if the message is an ADSI STA 151d MESG message or an ADSI STA 151d FONE message.

If at block 622 the message is an ADSI STA 151d MESG message, then the microprocessor 12 is directed to the MESG subroutine 386, upon return from which, the microprocessor 12 is directed back to block 616 to await further messages from the SPCS 36.

Alternatively, if at block 624 the message is an ADSI STA 151d FONE $01 message 69 (the microprocessor 12 being directed to examine the action code byte 62), then the microprocessor 12 is directed by block 626 to cause a DTMF "B" to be transmitted to the SPCS 36 to indicate successful completion of the call, to cause the CPE 10 to hang up the line 30, and to clear all CRC flag indicators 224, counters 236, 248, 338 and timers 200, 212. Thereafter, the microprocessor 12 is directed to return from the CRC Subroutine 372, Alternatively, if the message does not match, then block 628 directs the microprocessor 12 to cause a DTMF "A" signal to be transmitted to the SPCS 36 to indicate an unspecified error has occurred and to cause the CPE 10 to hang up the line 30. Thereafter, the microprocessor 12 is directed to abort the current CRC poll in favor of queuing a retry/backup poll session via the Queue Retry/Backup Subroutine 382 before directing the microprocessor 12 to return from the CRC Routine 372.

FIG. 20

With reference to FIGS. 1, 2, 9, 10 and 20, the FSU Subroutine is generally illustrated at 374 and defines an initial state 630 from which the microprocessor 12 begins execution. The FSU Subroutire 374 initiates and controls any FSU session.

Block 632 directs the microprocessor 12 to evaluate the polling timers 194, 196, 198, 200, 202, 204, 206, 208, 210, 212, 214, 216, 218 and to evaluate the difference between the CPE System Clock time 188 and the polling calendars 274, 276, 278, 280, 282, 322, 350 to determine whether any such value is below the poll proximity threshold 327. If so, then the microprocessor 12 is directed to abort the current FSU poll in favor of queuing a retry/backup poll session via the Queue Retry/Backup Subroutine 382 before directing the microprocessor 12 to return from the FSU Subroutine 374.

Alternatively, if no other autonomous call is proximate, block 636 directs the microprocessor 12 to evaluate the CPE idle timer 190 to determine if the CPE 10 has been idle sufficiently long in comparison to the CPE idle time threshold 328 that an autonomous calling session would not disturb the user. If not, then the microprocessor 12 is directed to abort the current FSU poll in favor of queuing a retry/backup poll session via the Queue Retry/Backup Subroutine 382 before directing the microprocessor 12 to return from the FSU Subroutine 374.

Alternatively, if at block 636 the CPE 10 has been sufficiently idle, then block 638 directs the CPE 10 to call the SPCS 36 to initiate a standard ADSI SDC session, to display the FSU display message 324 on the CPE display 25, and to poll the received daLa queue 185 for ADSI messages. If the FSU Subroutine 374 has been called from by the Originating Subroutine 364 or the Retry Subroutine 366, then the CPS 10 calls the primary FSU server telephone number 314. Alternatively, if the FSU Subroutine 374 has been called by the Backup Subroutine 368, then the CPE 10 calls the backup message sending server telephone number 316. Either way, the CPE 10 polls the received data queue 185 for an ADSI STA 151d QUER $81 message 68 from the SPCS 36 so that it can state to the SPCS 36 the purpose of its call.

If the microprocessor 12 determines under the direction of block 640 that the CPE 10 has not received a message from the SPCS 36 within the call time-out threshold 329, then block 642 directs the microprocessor 12 to cause the CPE 10 to transmit a DTMF "A" and to hang up the line 30, thereafter aborting the current FSU poll in favor of queuing a retry/backup poll session via the Queue Retry/Backup Subroutine 382 before directing the microprocessor 12 to return from the FSU Subroutine 374.

Alternatively, if at block 640 the CPE 10 does receive a message from the SPCS 36 within the call time-out threshold 329 then block 642 directs the microprocessor 12 to determine if the message is an ADSI STA 151d QUER $81 message 68. If not, then block 644 directs the microprocessor 12 to cause a DTMF "A" to be transmitted to the SPCS 36 to indicate an unspecified error has occurred and to cause the CPE 10 to hang up the line, after which the microprocessor 12 is directed to abort the current FSU poll in favor of queuing a retry/backup poll session via the Queue Retry/Backup Subroutine 382 before directing the microprocessor 12 to return from the FSU Subroutine 374.

Alternatively, if at block 642 the CPE 10 has received an ADSI STA 151d QUER $81 message from the SPCS 36, then block 646 directs the microprocessor 12 to cause the CPE 10 to transmit a DTMF "6B" to the SPCS 36 to indicate that the call is a CPE 10 initiated non-message poll.

Block 648 then directs the CPE 10 to poll for further messages from the SPCS 36. If the microprocessor 12 determines under the direction of block 650 that the CPE 10 has not received a message from the SPCS 36 within the call time-out threshold 329, then block 652 directs the microprocessor 12 to cause the CPE 10 to transmit a DTMF "A" and to hang up the line, and thereafter to abort the current FSU poll in favor of quelling a retry/backup poll session via the Queue Retry/Backup Subroutine 382 before directing the microprocessor 12 to return from the FSU Subroutine 374.

Alternatively, if at block 650 the CPE 10 receives a message from the SPCS 36, then blocks 654 and 656 respectively direct the microprocessor 12 to examine the application name bytes 46, 48, 50, 52 to determine if the message is an ADSI STA 151d SCRI message or an ADSI STA 151d FONE message.

If at block 654 the message is an ADSI STA 151d SCRI message, then the microprocessor 12 is directed to the SCRI subroutine 388, upon return from which, the microprocessor 12 is directed back to block 648 to await further messages from the SPCS 36.

Alternatively, if at block 656 the message is an ADSI STA 151d FONE $01 message 69 (the microprocessor 12 being directed to examine the action code byte 62), then the microprocessor 12 is directed by block 658 to cause a DTMF "B" to be transmitted Lu the SPCS 36 to indicate successful completion of the call, to cause the CPE 10 to hang up the line 30, and to clear all FSU flag indicators 228, counters 240, 252, 340 and timers 204, 216. Thereafter, the microprocessor 12 is directed to return from the FSU Subroutine 374.

Alternatively, if the message does not match, then block 660 directs the microprocessor 12 to cause a DTMF "A" signal to be transmitted to the SPCS 36 to indicate an error and to cause the CPE 10 to hang up the line. Thereafter, the microprocessor 12 is directed to abort the current FSU poll in favor of queuing a retry/backup poll session via the Queue Retry/Backup Subroutine 382 before directing the microprocessor 12 to return from the FSU Routine 374.

FIG. 21

With reference to FIGS. 1, 2, 9, 10 and 21, the SPP Subroutine is generally illustrated at 376 and defines an initial state 662 from which the microprocessor 12 begins execution. The SPP Subroutine 376 initiates and controls any SPP session.

Block 664 directs the microprocessor 12 to evaluate the polling timers 194, 196, 198, 200, 202, 204, 206, 208, 210, 212, 214, 216, 218 and to evaluate the difference between the CPE System Clock time 188 and the polling calendars 274, 276, 278, 280, 282, 322, 350 to determine whether any such value is below the poll proximity threshold 327. If so, then the microprocessor 12 is directed to abort the current SPP poll in favor of queuing a retry/backup poll session via the Queue Retry/Backup Subroutine 382 before directing the microprocessor 12 to return from the SPP Subroutine 376.

Alternatively, if at block 664 no other autonomous call is proximate, block 668 directs the microprocessor 12 to evaluate the CPE idle timer 190 to determine if the CPE 10 has been idle sufficiently long in comparison to the CPE idle time threshold 328 such that an autonomous calling session would not disturb the user. If not, then the microprocessor 12 is directed to abort the current SPP poll in favor of queuing a retry/backup poll session via the Queue Retry/Backup Subroutine 382 before directing the microprocessor 12 to return from the SPP Subroutine 376.

Alternatively, if at block 668 the CPE 10 has been sufficiently idle, then block 670 directs the CPE 10 to call the SPCS 36 to initiate a standard ADSI SDC session, to display the PP message 300 on the CPE display 25, and to poll the received data queue 185 for ADSI messages. If the SPP Subroutine 376 has been called from by the Originating Subroutine 364 or the Retry Subroutine 366, then the CPE 10 calls the primary page response server telephone number 290. Alternatively, if the SPP Subroutine 376 has been called by the Backup Subroutine 368, then the CPE 10 calls the backup page response server telephone number 292. Either way, the CPE 10 polls the received data queue 195 for an ADSI STA 151d QUER $81 message 68 from the SPCS 36 so that it can state to the SPCS 36 the purpose of its call.

If the microprocessor 12 determines under the direction of block 672 that the CPU 10 has not received a message from the SPCS 36 within the call time-out threshold 329, then block 674 directs the microprocessor 12 to cause the CPE 10 to transmit a DTMP "A" and to hang up the line, thereafter aborting the current SPP poll in favor of queuing a retry/backup poll session via the Queue Retry/Backup Subroutine 382 before directing the microprocessor 12 to return from the SPP Subroutine 376.

Alternatively, if at block 672 the CPE 10 does receive a message from the SPCS 36 within the call time-out threshold 329 then block 674 directs the microprocessor 12 to determine if the message is an ADST STA 151d QUER $81 message 68. If not, then block 676 directs the microprocessor 12 to cause a DTMF "A" to be transmitted to the SPCS 36 to indicate an unspecified error has occurred and to cause the CPE 10 to hang up the line, after which the microprocessor 12 is directed to abort the current SPP poll in favor of queuing a retry/backup poll session via the Queue Retry/Backup Subroutine 382 before directing the microprocessor 12 to return from the SPP Subroutine 376.

Alternatively, if at block 674 the CPE 10 has received an ADSI STA 151d QUER $81 message from the SPCS 36, then block 678 directs the microprocessor 12 to cause the CPE 10 to transmit a DTMF "4B" to the SPCS 36 to indicate that the call is a CPE 10 initiated page response poll.

Block 680 then directs the CPE 10 to poll for further messages from the SPCS 36. If the microprocessor 12 determines under the direction of block 682 that the CPE 10 has not received a message from the SPCS 36 within the call time-out threshold 329, then block 684 directs the microprocessor 12 to cause the CPE 10 to transmit a DTMF "A" and to hang up the line, and thereafter to abort the current SPP poll in favor of queuing a retry/backup poll session via the Queue Retry/Backup Subroutine 382 before directing the microprocessor 12 to return from the SPP Subroutine 376.

Alternatively, if at block 682 the CPE 10 receives a message from the SPCS 36, then blocks 686 and 688 respectively direct the microprocessor 12 to examine the message's application name bytes 46, 48, 50, 52 to determine if the message is an ADSI STA 151d MESG message or an ADSI STA 151d FONE message.

If at block 686 the message is an ADSI STA 151d MESG message, then the microprocessor 12 is directed to the MESG subroutine 386, upon return from which, the microprocessor 12 is directed back to block 680 to await further messages from the SPCS 36.

Alternatively, if at block 688 the message is an ADSI STA 151d FONE $01 message 69 (the microprocessor 12 being directed to examine the action code byte 62), then the microprocessor 12 is directed by block 690 to cause a DTMF "B" to be transmitted to the SPCS 36 to indicate successful completion of the call, to cause the CPE 10 to hang up the line 30, and to clear all SPP flag indicators 222, counters 234, 246, 334 and timers 198, 210. Thereafter, the microprocessor 12 is directed to return from the SPP Subroutine 376.

Alternatively, if the message does not match, then block 692 directs the microprocessor 12 to cause a DTMF "A" message to be transmitted to the SPCS 36 to indicate an error and to cause the CPE 10 to hang up the line. Thereafter, the microprocessor 12 is directed to abort the current SPP poll in favor of queuing a retry/backup poll session via the Queue Retry/Backup Subroutine 382 before directing the microprocessor 12 to return from the SPP Subroutine 376.

FIG. 22

With reference to FIGS. 1, 2, 9, 10 and 22, the IRN Subroutine is generally illustrated at 378 and defines an initial state 694 from which the microprocessor 12 begins execution. The IRN Subroutine 378 initiates and controls any IRN session.

Block 696 directs the microprocessor 12 to evaluate the polling timers 194, 196, 198, 200, 202, 204, 206, 208, 210, 212, 214, 216, 218 and to evaluate the difference between the CPE System Clock time 188 and the polling calendars 274, 276, 278, 280, 282, 322, 350 to determine whether any such value is below the poll proximity threshold 327. If so, then the microprocessor 12 is directed to abort the current SPP poll in favor of queuing a retry/backup poll session via the Queue Retry/Backup Subroutine 382 before directing the microprocessor 12 to return from the IRN Subroutine 378.

Alternatively, if at block 696 no other autonomous call is proximate, block 700 directs the microprocessor 12 to evaluate the CPE idle timer 190 to determine if the CPS 10 has been idle sufficiently long in comparison to the CPE idle time threshold 328 such that an autonomous calling session would not disturb the user. If not, then the microprocssor 12 is directed to abort the current IRN poll in favor of queuing a retry/backup poll session via the Queue Retry/Backup Subroutine 382 before directing the microprocessor 12 to return from the IRN Subroutine 378.

Alternatively, if at block 700 the CPE 10 has been sufficiently idle, then block 702 directs the CPE 10 to call the SPCS 36 to initiate a standard ADSI SDC session, to display the message sending display message 310 on the CPE display 25, and to poll the received data queue 185 for ADSI messages. If the IRN Subroutine 378 has been called from by the originating Subroutine 364 or the Retry Subroutine 366, then the CPE 10 calls the primary message sending server telephone number 302. Alternatively, if the IRN Subroutine 378 has been called by the Backup Subroutine 368, then the CPE 10 calls the backup message sending server telephone number 304. Either way, the CPE 10 polls the received data queue 185 for an ADSI STA 151d QUER $81 message 68 from the SPCS 36 so that it can state to the SPCS 36 the purpose of its call.

If the microprocessor 12 determines under the direction of block 704 that the CPE 10 has not received a message from the SPCS 36 within the call time-out threshold 329, then block 706 directs the microprocessor 12 to cause the CPE 10 to transmit a DTMF "A" and to hang up the line, thereafter aborting the current IRN poll in favor of queuing a retry/backup poll session via the Queue Retry/Backup Subroutine 382 before directing the microprocessor 12 to return from the IRN Subroutine 378.

Alternatively, if at block 704 the CPE 10 does receive a message from the SPCS 36 within the call time-out threshold 329 then block 708 directs the microprocessor 12 to determine if the message is an ADSI STA 151d QUER $81 message 68. If not, then block 710 directs the microprocessor 12 to cause a DTMF "A" to be transmitted to the SPCS 36 to indicate an unspecified error has occurred and to cause the CPE 10 to hang up the line, after which the microprocessor 12 is directed to abort the current IRN poll in favor of queuing a retry/backup poll session via the Queue Retry/Backup Subroutine 382 before directing the microprocessor 12 to return from the IRN Subroutine 378.

Alternativeiy, if at block 708 the CPE 10 has received an ADSI STA 151d QUER $81 message from the SPCS 36, then block 712 directs the microprocessor 12 to cause the CPE 10 to transmit a DTMF "5B" to the SPCS 36 to indicate that the call is a CPE 10 initiated message send only/non-interactive poll.

Block 714 then directs the CPE 10 to poll for further messages from the SPCS 36. if the microprocessor 12 determines under the direction of block 716 that the CPE 10 has not received a message from the SPCS 36 within the call time-out threshold 329, then block 718 directs the microprocessor 12 to cause the CPE 10 to transmit a DTMF "A" and to hang up the line, and thereafter to abort the current IRN poll in favor of queuing a retry/backup poll session via the Queue Retry/Backup Subroutine 382 before directing the microprocessor 12 to return from the IRN Subroutine 378.

Alternatively, if at block 716 the CPE 10 receives a message from the SPCS 36, then blocks 720 and 722 respectively direct the microprocessor 12 to examine the application name bytes 46, 48, 50, 52 to determine if the message is an ADSI STA 151d MESG message or an ADSI STA 151d FONE message.

If at block 720 the message is an ADSI STA 151d MESG message, then the microprocessor 12 is directed to the MESG subroutine 386, upon return from which, the microprocessor 12 is directed back to block 714 to await further messages from the SPCS 36.

Alternatively, if at block 722 the message is an ADSI STA 151d FONE $01 message 69 (the microprocessor 12 being directed to examine the action code byte 62), then the microprocessor 12 is directed by block 724 to cause a DTMF "B" to be transmitted to the SPCS 36 to indicate successful completion of the call, to cause the CPE 10 to hang up the line 30, and to clear all IRN flag indicators 226, counters 238, 250, 336 and timers 202, 214. Thereafter, the microprocessor 12 is directed to return from the IRN Subroutine 378.

Alternatively, if the message does not match, then block 726 directs the microprocessor 12 to cause a DTMF "A" signal to be transmitted to the SPCS 36 to indicate an error and to cause the CPE 10 to hang up the line. Thereafter, the microprocessor 12 is directed to abort the current IRN poll in favor of queuing a retry/backup poll session via the Queue Retry/Backup Subroutine 382 before directing the microprocessor 12 to return from the IRN Subroutine 378.

FIG. 23

With reference to FIGS. 1, 2, 9, 10 and 23, the MSR Subroutine is generally illustrated at 380 and defines an initial state 728 from which the microprocessor 12 begins execution. The MSR Subroutine 380 initiates and controls any MSR session. Block 730 directs the microprocessor 12 to evaluate the polling timers 194, 196, 198, 200, 202, 204, 206, 208, 210, 212, 214, 216, 218 and to evaluate the difference between the CPE System Clock time 188 and the polling calendars 274, 276, 278, 280, 282, 322, 350 to determine whether any such value is below the poll proximity threshold 327. If so, then the microprocessor 12 is directed to abort theo current MSR poll in favor of queuing a retry/backup poll session via the Queue Retry/Backup Subroutine 382 before directing the microprocessor 12 to return from the MSS Subroutine 380.

Alternatively, it at block 730 no other autonomous call is proximate, block 734 directs the microprocessor 12 to evaluate the CPE idle timer 190 to determine if the CPE 10 has been idle sufficiently long in comparison to the CPE idle time threshold 328 such that an autonomous calling session would not disturb the user. If not, then the microprocessor 12 is directed to abort the current MSR poll in favor of queuing a retry/backup poll session via the Queue Retry/Backup Subroutine 382 before directing the microprocessor 12 to return from the MSR Subroutine 380.

Alternatively, if at block 734 the CPE 10 has been sufficiently idle, then block 736 directs the CPE 10 to call the SPCS 36 to initiate a standard ADSI SDC session, to display the message sending display message 310 on the CPE display 25, and to poll the received data queue 185 for ADSI messages. If the MSR Subroutine 380 has been called from by the Originating Subroutine 364 or the Retry Subroutine 366, then the CPE 10 calls the primary message sending server telephone number 302. Alternatively, if the MSR Subroutine 380 has been called by the Backup Subroutine 368, then the CPE 10 calls the backup message sending server telephone number 304. Either way, the CPE 10 polls the received data queue 185 for an ADSl STA 151d QUER $81 message 68 from the SPCS 36 so that it can state to the SPCS 36 the purpose of its call.

If the microprocessor 12 determines under the direction of block 738 that the CPE 10 has not received a message from the SPCS 36 within the call time-out threshold 329, then block 740 directs the microprocessor 12 to cause the CPE 10 to transmit a DTMF "A" and to hang up the line, thereafter aborting the current IRN poll in favor of queuing a retry/backup poll session via the Queue Retry/Backup Subroutine 382 before directing the microprocessor 12 to return from the MSR Subroutine 380.

Alternatively, if at block 738 the CPE 10 does receive a message from the SPCS 36 within the call time-out threshold 329 then block 742 directs the microprocessor 12 to determine if the message is an ADSI STA 151d QUER $81 message 68. If not, then block 744 directs the microprocessor 12 to cause a DTMF "A" to be transmitted to the SPCS 36 to indicate an unspecified error has occurred and to cause the CPE 10 to hang up the line, after which the microprocessor 12 i c directed to abort the current MSR poll in favor of queuing a retry/backup poll session via the Queue Retry/Backup Subroutine 382 before directing the microprocessor 12 to return from the MSR Subroutine 380.

Alternatively, if at block 742 the CPE 10 has received an ADSI STA 151d QUER $81 message from the SPCS 36, then block 746 directs the microprocessor 12 to cause the CPE 10 to transmit a DTMF "5B" to the SPCS 36 to indicate that the call is a CPE 10 initiated message send only/non-interactive poll.

Block 748 then directs the CPE 10 to poll for further messages from the SPCS 36. If the microprocessor 12 determines under the direction of block 750 that the CPE 10 has not received a message from the SPCS 36 within the call time-out threshold 329, then block 752 directs the microprocessor 12 to cause the CPE 10 to transmit a DTMF "A" and to hang up the line, and thereafter to abort the current MSR poll in favor of queuing a retry/backup poll session via the Queue Retry/Backup Subroutine 382 before directing the microprocessor 12 to return from the MSR Subroutine 380.

Alternatively, if at block 750 the CPE 10 receives a message from the SPCS 36, then blocks 754 and 756 respectively direct the microprocessor 12 to examine the message's application name bytes 46, 48, 50, 52 to determine if the message is an ADSI STA 151d MESG message or an ADSI STA 151d FONE message.

If at block 754 the message is an ADSI STA 151d MESG message, then the microprocessor 12 is directed to the MESG subroutine 386, upon return from which, the microprocessor 12 is directed back to block 746 to await further messages from the SPCS 36, Alternatively, if at block 756 the message is an ADSI STA 151d FONE $01 message 69 (the microprocessor 12 being directed to examine the action code byte 62), then the microprocessor 12 is directed by block 758 to cause a DTMF "B" to be transmitted to the SPCS 36 to indicate successful completion of the call, to cause the CPE 10 to hang up the line 30, and to clear all MSR flag indicators 230, counters 242, 254, 342 and timers 206, 218. Thereafter, the microprocessor 12 is directed to return from the MSR Subroutine 380.

Alternatively, it the message does not match, then block 760 directs the microprocessor 12 to cause a DTMF "A" message to be transmitted to the SPCS 36 to indicate an error and to cause the CPE 10 to hang up the line. Thereafter, the microprocessor 12 is directed to abort the current MSR poll in favor of queuing a retry/backup poll session via the Queue Retry/Backup Subroutine 382 before directing the microprocessor 12 to return from the MSR Subroutine 380.

FIG. 24

With reference to FIGS. 1, 2, 9, 10 and 24, the Queue Retry/Backup Subroutine is generally illustrated at 382 and defines an initial state 762 from which the microprocessor 12 begins execution. The Queue Retry/Backup Subroutine 382 queues up retry and backup attempts to call a SPCS 36 when prior attempts have failed. It also disables types of sessions that have failed too often.

Block 764 directs the microprocessor 12 to cause to be recorded in the failure log 343 the current system time 188, the subroutine 370, 372, 374, 376, 378, 380 that called the Queue Retry/Backup Subroutine 382, the location in the calling routine 370, 372, 374, 376, 378, 380 from which the Queue Retry/Backup Subroutine 382 was called, and a record delimiter. The failure log 343 is maintained conventionally as a variable length database, the contents being available to a technician to diagnose problems in the CPE 10 such as conflicting session schedules.

Block 774 then directs the microprocessor 12 to compare the retry counter 232, 234, 236, 238, 240, 242 associated with the calling subroutine 370, 372, 374, 376, 378, 380, to the maximum number of retry sessions 284, 298, 306, 306, 318, 306 associated with the respective calling subroutine. If the maximum number of retry sessions 284, 298, 306, 306, 318, 306 has not been exceeded, then block 776 directs the microprocessor 12 to increment the appropriate retry counter 232, 234, 236, 238, 240, 242, and block 778 directs the microprocessor 12 to load the appropriate retry timer 196, 198, 200, 202, 204, 206 with the specified retry delay time 286, 296, 308, 309, 320, 308. Thereafter, block 772 directs the microprocessor 12 to return to the calling subroutine 370, 372, 374, 376, 378, 380.

Alternatively, if at block 774 the maximum number of retry attempts has been made, then block 780 directs the microprocessor 12 to compare the backup counter 244, 246, 248, 250, 252, 254 associated with the calling subroutine 370, 372, 374, 376, 378, 380, to the maximum number of retry sessions 284, 298, 306, 306, 318, 306 associated with the respective calling subroutine. If the maximum number of backup sessions 244, 246, 248, 250, 252, 254 has not been exceeded, then block 782 directs the microprocessor 12 to increment the appropriate backup counter 244, 246, 248, 250, 252, 254, and block 784 directs the microprocessor 12 to load the appropriate backup timer 209, 210, 212, 214, 216, 218 with the specified retry delay time 286, 296, 308, 308, 320, 308. Thereafter, block 772 directs the microprocessor 12 to return to the calling subroutine 370, 372, 374, 376, 378, 380.

Alternatively if at block 780, the maximum number of backup attempts has been made, then block 766 then directs the microprocessor 12 to increment the failure counter 332, 334, 336, 338, 340, 342 associated with the calling subroutine 370, 372, 374, 376, 378, 380. Block 768 then directs the microprocessor 12 to compare such failure counter 332, 334, 336, 338, 340, 342 with the feature disable error threshold 330 to determine whether the calling subroutine has such a poor connection record as to warrant disablement pending diagnosis. If so, then block 770 directs the microprocessor 12 to set the disabled indicator 227 in the appropriate status flag 220, 222, 224, 226, 228, 230. Thereafter, block 772 directs the microprocessor 12 to return to the calling subroutine 370, 372, 374, 376, 378, 380.

Alternatively, if the disable error threshold 330 has not been exceeded, then block 772 directs the microprocessor 12 to simply return to the calling subroutine 370, 372, 374, 376, 378, 380 and to make no further attempts to complete the instant poll.

FIG. 25

With reference to FIGS. 1, 2, 9, 10 and 25, the POLL subroutine is generally illustrated at 384 and defines an initial state 786 from which the microprocessor 12 begins execution. This execution commences within a standard ADSI SDC session. The POLL Subroutine 384 instructs the CPE 10 how to respond to the POLL family 60 of extended STA codes 40 that configure the MDP and SPP sessions.

Block 788 directs the microprocessor 12 to determine if the STA action code 62 of the most recently polled message is a "01" to reconfigure the CPE's 10 MDP parameters. If so, then block 790 directs the microprocessor 12 to parse the STA data 64 into its component parts with reference to the "FF" delimiters 132, 136, 148 and 156 in FIG. 7. Block 792 then directs the microprocessor 12 to check the parsed data 64 to make sure that it is consistent with the expected data structure 258 in FIG. 10. If not, block 794 directs the microprocessor 12 to cause a DTMF "5A" to be transmitted to indicate to the SPCS 36 that a parsing error has occurred. Thereafter, block 796 directs the microprocessor 12 to return to the calling subroutine.

Alternatively, if at block 792 the parsed data has the expected structure, then block 798 directs the microprocessor 12 to consider whether these new MDP parameters comply with the limits set by telecommunication regulations 345, for example with respect to repeated automated calling. If not, then block 800 directs the microprocessor 12 to cause a DTMF "1A" to be transmitted to indicate to the SPCS 36 that the new configuration violates local telecommunication regulations. Thereafter, block 796 directs the microprocessor 12 to return to the calling subroutine.

Alternatively, if at block 799 the new parameters are permissible, then block 802 directs the microprocessor 12 to present the new parameters to the user via the display 25. Block 804 directs the microprocessor 12 to poll the user's response at the keypad 27 for a set period of time. If the user rejects the new parameters, then block 806 directs the microprocessor 12 to cause a DTMF "3A" to be transmitted to indicate to the SPCS 36 that the user has rejected the new configuration. Thereafter, block 796 directs the microprocessor 12 to return to the calling subroutine.

Alternatively, if at block 804 the user accepts the new parameters or the polling period expires without user input, then block 808 directs the microprocessor 12 to store the parsed data into the MDP configuration block 258 in FLASH 18. Because this reconfiguration process is autonomous, it is undesirable to make major configuration changes unless the CPE 10 user is known to be present during the process by his acceptance or rejection signal.

Block 810 directs the microprocessor 12 to check the memory transfer, comparing the values stored in RAM 14 to those stored in FLASH 18. If a memory error has occurred, then block 812 directs the microprocessor 12 to cause a DTMF "4A" to be transmitted to indicate to the SPCS 36 that a memory error has occurred. Thereafter, block 796 directs the microprocessor 12 to return to the calling subroutine.

Alternatively, if at block 810 no memory error has occurred, then block 814 directs the microprocessor 12 to ensure that no other error has occurred during this reconfiguration. If another error has occurred, then block 816 directs the microprocessor 12 to cause a DTMF "A" to be transmitted to indicate to the SPCS 36 that an unspecified error has occurred. Thereafter, block 796 directs the microprocessor 12 to return to the calling subroutine.

Alternatively, if at block 814 no unspecified error occurred, then block 818 directs the microprocessor 12 to cause a DTMF "B" to be transmitted to indicate to the SPCS 36 that the reconfiguration occurred properly. Thereafter, block 796 directs the microprocessor 12 to return to the calling subroutine.

Alternatively, block 820 directs the microprocessor 12 to determine if the STA action code 62 of the most recently polled message is a "$02" to reconfigure the SPP parameters. If so, then block 822 directs the microprocessor 12 to parse the STA data 64 into its component parts with reference to the "$FF" delimiters 162, 166 and 176 in FIG. 7.

Block 824 then directs the microprocessor 12 to check the parsed data 64 to make sure that it is consistent with the expected data structure 260. If not, block 826 directs the microprocessor 12 to cause a DTMF "5A" to be transmitted to indicate to the SPCS 36 that a parsing error has occurred. Thereafter, block 828 directs the microprocessor 12 to return to the calling subroutine.

Alternatively, if at block 824 the parsed data has the expected structure, then block 830 directs the microprocessor 12 to consider whether these new SPP parameters comply with the limits set by telecommunication regulations 345, for example with respect to repeated automated calling. If not, then block 832 directs the microprocessor 12 to cause a DTMF "1A" to be transmitted to indicate to the SPCS 36 that the new configuration violates local telecommunication regulations. Thereafter, block 828 directs the microprocessor 12 to return to the calling subroutine.

Alternatively, if at block 830 the new parameters are permissible, then block 834 directs the microprocessor 12 to present the new parameters to the user via the display 25. Block 836 directs the microprocessor 12 to poll the user's response at the keypad 27 for a set period of time. If the user rejects the new parameters, then block 838 directs the microprocessor 12 to cause a DTMP "3A" to be transmitted to indicate to the SPCS 36 that the user has rejected the new configuration. Thereafter, block 828 directs the microprocessor 12 to return to the calling subroutine.

Alternatively, if at block 836 the user accepts the new parameters or the polling period expires without user input, then block 840 directs the microprocessor 12 to store the parsed data into the SPP configuration block 260 in FLASH 18.

Block 842 directs the microprocessor 12 to check the memory transfer, comparing the values stored in RAM 14 to those stored in FLASH 18. If a memory error has occurred, then block 844 directs the microprocessor 12 to cause a DTMF "4A" to be transmitted to indicate to the SPCS 36 that a memory error has occurred. Thereafter, block 828 directs the microprocessor 12 to return to the calling subroutine.

Alternatively, if at block 842 no memory error has occurred, then block 846 directs the microprocessor 12 to ensure that no other error has occurred during this reconfiguration. If another error has occurred, then block 848 directs the microprocessor 12 to cause a DTMF "A" to be transmitted to indicate to the SPCS 36 that an unspecified error has occurred. Thereafter, block 828 directs the microprocessor 12 to return to the calling subroutine.

Alternatively, if at block 846 no unspecified error occurred, then block 850 directs the microprocessor 12 to cause a DTMF "B" to be transmitted to indicate to the SPCS 36 that the reconfiguration occurred properly. Thereafter, block 828 directs the microprocessor 12 to return to the calling subroutine.

Alternatively, if at block 820 the STA action code 62 is not "$02", then block 851 directs the microprocessor 12 to implement further actions related to such configuration but which are left unspecified as not being part of the present invention. Thereafter, block 828 directs the microprocessor 12 to return to the calling subroutine.

FIG. 26

With reference to FIGS. 1, 2, 9, 10 and 26, the MESG subroutine is generally illustrated at 386 and defines an initial state 852 from which the microprocessor 12 begins execution. The MESG Subroutine 386 instructs the CPE 10 how to respond to the MESG family 56 of extended STA codes 40 that configure the CRC, IRN and MSR sessions.

Block 854, not part of the invention, directs the microprocessor 12 through the process of exchanging stored message data such as pages and e-mails between the CPE 10 and the SPCS 36. This direction is more fully described in the co-pending patent application entitled, "Method, System and Apparatus for Exchanging Stored Information Between a Telecommunications Server and Customer Premises Equipment," which is incorporated herein by reference.

However, block 856 directs the microprocessor 12 to determine whether STA action code 62 of the most recently polled message is a "$18" to reconfigure the IRN/CRC/MSR parameters. If not, then block 858 directs the microprocessor 12 to return to the calling subroutine.

Alternatively, if the STA action code 62 is "$18", then block 860 directs the microprocessor 12 to parse the STA data 64 into its components parts with reference to the "$FF" delimiters (76, 80, 88, 92 and 96 in FIG. 5). Block 862 then directs the microprocessor 12 to check the parsed data 64 to make sure that it is consistent with the expected data structure 262. If not, block 864 directs the microprocessor 12 to cause a DTMF "5A" to be transmitted to indicate to the SPCS 36 that a parsing error has occurred Thereafter, block 858 directs the microprocessor 12 to return to the calling subroutine.

Alternatively, if at block 862 the parsed data has the expected structure, then block 866 directs the microprocessor 12 to store the parsed data into the IRN/CRC/MSR configuration block 262 in FLASH 18.

Block 868 directs the microprocessor 12 to check the memory transfer, comparing the values stored in RAM 14 to those stored in FLASH 18. If a memory error has occurred, then block 870 directs the microprocessor 12 to cause a DTMF "4" to be transmitted to indicate to the SPCS 36 that a memory error has occurred. Thereafter, block 858 directs the microprocessor 12 to return to the calling subroutine.

Alternatively, if at block 868 no memory error has occurred, then block 870 directs the microprocessor 12 to ensure that no other error has occurred during this reconfiguration. If another error has occurred, then block 872 directs the microprocessor 12 to cause a DTMF "A" to the transmitted to indicate to the SPCS 36 that an unspecified error has occurred. Thereafter, block 872 directs the microprocessor 12 to return to the calling subroutine.

Alternatively, if at block 870 no unspecified error occurred, then block 874 directs the microprocessor 12 to cause a DTMF "B" to be transmitted to indicate to the SPCS 36 that the reconfiguration occurred properly. Thereafter, block 858 directs the microprocessor 12 to return to the calling subroutine.

FIG. 27

With reference to FIGS. 1, 2, 9, 10 and 27, the SCRI subroutine is generally illustrated at 388 and defines an initial state 876 from which the microprocessor 12 begins execution. The SCRI Subroutine 388 instructs the CPE 10 how to respond to the SCRI family 58 of extended STA codes 40 that configure the FSU sessions.

Block 878, not part of the invention, directs the microprocessor 12 through the process of prioritizing, downloading and executing scripts stored within the CPE 10.

Block 879 directs the microprocessor 12 to determine whether the STA action code 62 of the most recently polled message is a "$01" to commence a non-interactive Feature Downlodd Management (FDM) session within the current Server Display Control (SDC) session. If so, then block 881 directs the microprocessor 12 to determine whether the CPE-ID encapsulated within the data portion of the STA corresponds to the CPE-ID 339 in FLASH 18. If so, then block 883 directs the microprocessor 12 to cause a DTMF "B" to be transmitted and then to start an FDM session as per ADSI ref. SR-2461 page 65, Dec. 92 which is incorporated herein by reference, after which block 885 directs the microprocessor 12 to return from the SCRI subroutine 876. Alternatively if at block 881, the CPE-IDs do not match, then block 887 directs the microprocessor 12 to cause a DTMF "3A" to be transmitted and then block 885 directs the microprocessor 12 to return directly from the SCRI subroutine 876.

Alternatively, if at block 879 the action code 62 is not "01", then block 880 directs the microprocessor 12 to determine whether the received STA action code 62 is a "$06" to reconfigure the CPE's 10 FSU parameters. If not, then block 882 directs the microprocessor 12 to return to the calling subroutine.

Alternatively, if at block 880 the STA action code 62 is "$06", then block 884 directs the microprocessor 12 to parse the STA data 64 into its component parts with reference to the "$FF" delimiters (108, 112, 116 and 124 in FIG. 6). Block 886 then directs the microprocessor 12 to check the parsed data 64 to make sure that it is consistent with the expected data structure 264. If not, block 888 directs the microprocessor 12 to cause a DTMF "5A" to be transmitted to indicate to the SPCS 36 that a parsing error has occurred. Thereafter, block 882 directs the microprocessor 12 to return to the calling subroutine.

Alternatively, if at block 886 the parsed data has the expected structure, then block 890 directs the microprocessor 12 to determine whether the FDM number 102 and security code 104 are as expected. If not, then block 892 directs the microprocessor 12 to cause a DTMF "3A" to be transmitted to indicate to the SPCS 36 that a mismatch error has occurred. Thereafter, block 882 directs the microprocessor 12 to return to the calling subroutine.

Alternatively, if at block 890 no mismatch has occurred, then block 894 directs the microprocessor 12 to consider whether these new FSU parameters comply with the limits set by telecommunication regulations 345, for example with respect to repeated automated calling. If not, then block 896 directs the microprocessor 12 to cause a DTMF "1A" to be transmitted to indicate to the SPCS 36 that the new configuration violates local telecommunication regulations. Thereafter, block 882 directs the microprocessor 12 to return to the calling subroutine.

Alternatively, if at block 894 no regulation violation has occurred, then block 898 directs the microprocessor 12 to store the parsed data into the FSU configuration block 264 in FLASH 18.

Block 900 directs the microprocessor 12 to check the memory transfer, comparing the values stored in RAM 14 to those stored in FLASH 18. If a memory error has occurred, then block 902 directs the microprocessor 12 to cause a DTMF "4A" to be transmitted to indicate to the SPCS 36 that a memory error has occurred. Thereafter, block 882 directs the microprocessor 12 to return to the calling subroutine.

Alternatively, if at block 900 no memory error has occurred, then block 904 directs the microprocessor 12 to ensure that no other error has occurred during this reconfiguration. If another error has occurred, then block 906 directs the microprocessor 12 to cause a DTMF "A" to be transmitted to indicate to the SPCS 36 that an unspecified error has occurred. Thereafter, block 882 directs the microprocessor 12 to return to the calling subroutine.

Alternatively, if at block 904 no unspecified error occurred, then block 908 directs the microprocessor 12 to cause a DTMF "B" to be transmitted to indicate to the SPCS 36 that the reconfiguration occurred properly. Thereafter, block 882 directs the microprocessor 12 to return to the calling subroutine.

FIG. 28

With reference to FIGS. 1, 2, 9, 10 and 28, the REMI subroutine is generally illustrated at 389 and defines an initial state 910 from which the microprocessor 12 begins execution. The REMI Subroutine 389 instructs the CPE 10 how to respond to the REMI family 56 of extended STA codes 40 that configure the CRC events stored in FLASH 18.

Block 912, not part of the invention, directs the microprocessor 12 through the process of manipulating the CRC events 344 in the CPE FLASH 18 under the direction of the SPCS 36.

However, block 914 directs the microprocessor 12 to determine whether the STA action code 62 of the most recently polled message is a "01" to download a new CRC event 344. If not, then block 916 directs the microprocessor 12 to return to the calling subroutine.

Alternatively, if the STA action code 62 is "$01", then block 918 directs the microprocessor 12 to parse the STA data 64 into its component parts with reference to the "$FF" delimiters (139 in FIG. 8). Block 920 then directs the microprocessor 12 to check the parsed data 64 to make sure that it is consistent with the expected data structure 344. If not, block 922 directs the microprocessor 12 to cause a DTMF "5A" to be transmitted to indicato to the SPCS 36 that a parsing error has occurred. Thereafter, block 916 directs the microprocessor 12 to return to the calling subroutine.

Alternatively, if at block 920 the parsed data has the expected structure, then block 924 directs the microprocessor 12 to store the parsed data into the CRC event 344 section of FLASH 18.

Block 926 directs the microprocessor 12 to check the memory transfer, comparing the values stored in RAM 14to those stored in FLASH 18. If a memory error has occurred, then block 928 directs the microprocessor 12 to cause a DTMF "4A" to be transmitted to indicate to the SPCS 36 that a memory error has occurred. Thereafter, block 916 directs the microprocessor 12 to return to the calling subroutine.

Alternatively, if at block 926 no memory error has occurred, then block 930 directs the microprocessor 12 to ensure that no other error has occurred during this reconfiguration. If another error has occurred, then block 932 directs the microprocessor 12 to cause a DTMF "A" to be transmitted to indicate to the SPCS 36 that an unspecified error has occurred. Thereafter, block 916 directs the microprocessor 12 to return to the calling subroutine.

Alternatively, if at block 930 no unspecified error occurred, then block 934 directs the microprocessor 12 to cause a DTMF "B" to be transmitted to indicate to the SPCS 36 that the reconfiguration occurred properly. Thereafter, block 916 directs the microprocessor 12 to return to the calling subroutine.

FIG. 29

Figure 29:
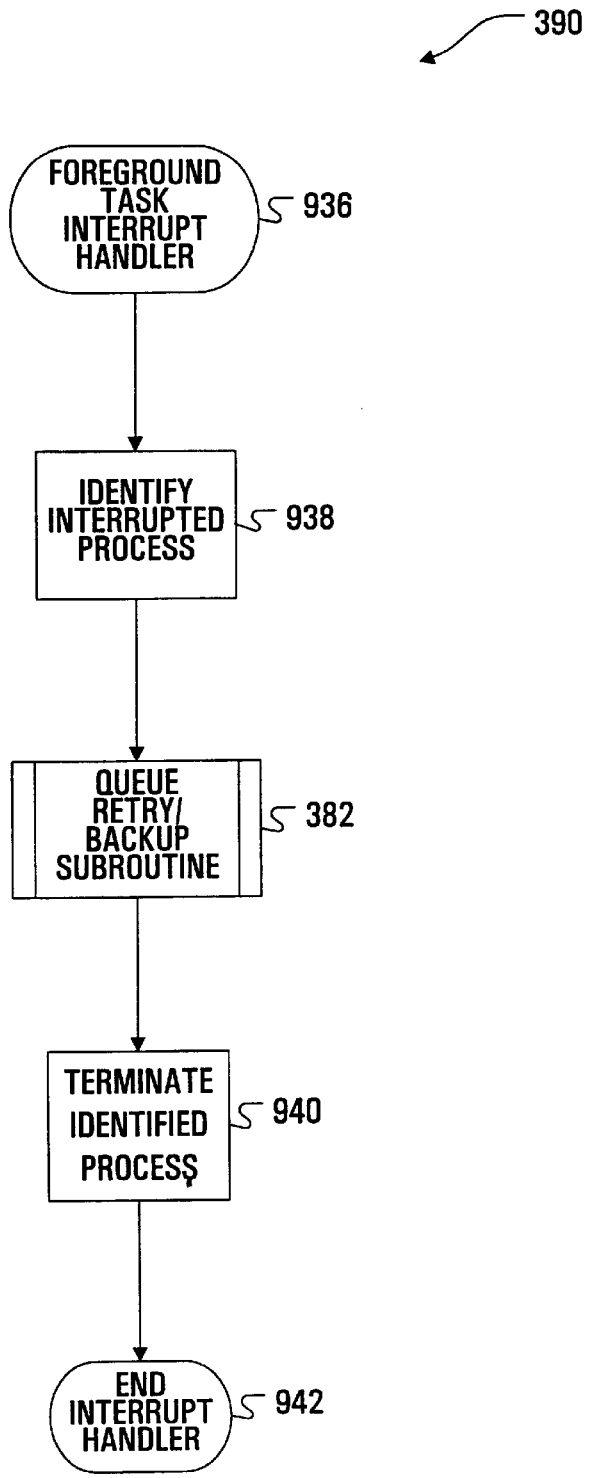
FIG. 29 is a flowchart of a Foreground Task Interrupt Handler encoded in the ROM as illustrated in FIG. 11.

With reference to FIGS. 1 and 29, the Foreground Task Interrupt Handler is generally illustrated at 390 and defines an initial state 936 from which the microprocessor 12 begins execution. The Foreground Task Interrupt Handler is invoked whenever the keypad 27 or the hook-switch are manually engaged by a user, which indicate to the microprocessor 12 that the user wishes to employ the CPE 10 as a conventional telephone.

Block 938 directs the microprocessor 12 to identify the interrupted process from the stack. The microprocessor 12 is then directed to the Queue Retry/Backup Subroutine 382 to queue a retry/backup poll to replace the interrupted one. The Queue Retry/Backup Subroutine 382 is designed to look beyond the calling Foreground Task Interrupt Handler 390 to identify the interrupted process on the stack, and to operate on the latter's flag, counters, and timers.

Upon returning from the Queue Retry/Backup Subroutine 382, the block 940 directs the microprocessor 12 to terminate the interrupted process and block 942 directs the microprocessor 12 to end the Foreground Task Interrupt Handler.

From the foregoing, it can be seen that it is advantageous for a CPE 10 to autonomously call a SPCS 36. Such autonomous calls can be triggered by a regular schedule, calendar events, telephone calls placed to the CPE 10, or pages transmitted by the CPS 10. The calls can be for the purpose of exchanging data, configuring parameters, or updating scripts.

While a specific embodiment of the invention has been described and illustrated, such embodiment should be considered illustrative of the invention only and not as limiting the invention as construed in accordance with the accompanying claims.

What is claimed is:

1. A method of automatically receiving information at customer premises equipment (CPE), the method comprising:
    a) measuring idle time elapsed since the CPE was last used;
    b) transmitting a current information request message from said CPE to a messaging platform when the idle time is greater than a pre-defined idle time threshold; and
    c) receiving information from said messaging platform in response to said information request message.

2. A method as claimed in claim 1 further comprising:
    a) maintaining a polling calendar identifying a time at which a scheduled information request message is to be sent to said messaging platform;
    b) determining the difference in time between a present time and said time at which an information request message is to be sent; and
    c) transmitting said current information request message when said idle time is greater than a pre-defined idle threshold and said difference in time is less than a poll proximity threshold.

3. A method as claimed in claim 2 further comprising:
    a) measuring time elapsed since transmitting said information request message and continuing to measure time elapsed while said information is being received; and
    b) terminating receiving said information when said time elapsed exceeds a pre-defined time duration.

4. A method as claimed in claim 3 further comprising:
    a) detecting whether a hook switch at the CPE is in an on-hook state or an off-hook state; and
    b) terminating at least one of transmitting and receiving when said hook switch is changed from the on-hook state to the off-hook state.

5. A method as claimed in claim 1 wherein measuring is initiated in response to CLID information.

6. A method as claimed in claim 1, wherein measuring is initiated at pre-defined time intervals.

7. A method as claimed in claim 1 wherein transmitting includes the step of dialling a first predefined telephone number.

8. A method as claimed in claim 7 further including transmitting said information request using DTMF signals.

9. A method as claimed in claim 8 further including dialling at least one alternate telephone number when a call cannot be completed to a station associated with said first pre-defined telephone number is unavailable.

10. A method as claimed in claim 1 wherein receiving said requested information includes receiving said information according to the ADSI protocol.

11. A method as claimed in claim 1 wherein measuring is initiated at pre-defined times.

12. A method as claimed in claim 11 wherein measuring is further initiated at pre-defined times after said information is received from said messaging platform.

13. A system for automatically receiving information at customer premises equipment (CPE), the apparatus comprising:
    (a) a first timer for measuring idle time elapsed since the CPE was last used;
    b) a transmitter for transmitting an information request message from said CPE to a messaging platform when the idle time is greater than a pre-defined idle time threshold; and
    c) a receiver for receiving information from said messaging platform in response to said information request message.

14. A system as claimed in claim 13 further including a fourth timer for identifying a fourth pre-defined time, said fourth timer being operable to stimulate said transmitter to transmit said information request message at said fourth pre-defined time when the idle time is greater than a pre-defined idle time threshold.

15. A system as claimed in claim 13 further including a fifth timer for identifying pre-defined time intervals, said fifth timer being operable to stimulate said transmitter to transmit said information request message at said pre-defined time intervals when the idle time is greater than a pre-defined idle time threshold.

16. A system as claimed in claim 13 further including a CLID receiver for receiving CLID information and a processor for determining whether or not said CLID information meets pre-defined criteria and if so, stimulating said transmitter to transmit said information request message when the idle time is greater than said pre-defined idle time threshold.

17. An apparatus as claimed in claim 13 wherein said transmitter includes a dialler.

18. An apparatus as claimed in claim 17 wherein said dialler is operable to dial a first predefined telephone number.

19. An apparatus as claimed in claim 17 wherein said dialler is operable to transmit said information request using DTMP signals.

20. A system as claimed in claim 18 wherein said dialler is operable to dial at least one alternate telephone number when a call cannot be completed to a station associated with said first pre-defined telephone number.

21. An apparatus as claimed in claim 13 wherein said receiver is operable to receive said requested information according to the ADSI protocol.

22. A system as claimed in claim 13 further comprising:
    a) a storage medium for maintaining a polling calendar identifying times at which a scheduled information request message is to be sent to said messaging platform;
    b) a second timer for measuring a proximity time interval between a present time and the time at which a most proximate scheduled information request message is scheduled to be transmitted from said CPE to said messaging platform; and c) a processor programmed to cause said transmitter to transmit an information request message when the idle time is greater than said pre-defined idle threshold and said proximity time interval is greater than a pre-defined proximity threshold.

23. An apparatus as claimed in claim 22 further comprising a third timer for measuring time elapsed since transmitting the information request message from said CPE to said messaging platform and for disabling the transmitter and the receiver when the time measured by said third timer exceeds a pre-defined call timeout threshold.

24. A apparatus as claimed in claim 23 further comprising a detector for detecting whether the hook switch is in an on-hook state or an off-hook state and for disabling the transmitter and the receiver in response to the detector detecting that the hook switch is changed from the on-hook state to the off-hook state.

25. A system for providing messaging services at customer premises equipment (CPE), the system comprising:

a) a messaging platform for receiving and storing messages, said messaging platform including a receiver for receiving information request messages and a transmitter for transmitting information; and b) customer premises equipment including:

i) a first timer for measuring idle time elapsed since the CPE was last used;

ii) a transmitter for transmitting an information request message from said CPE to said messaging platform when the idle time is greater than a pre-defined idle time threshold; and iii) a receiver for receiving information from said messaging platform in response to said information request message.

26. A system as claimed in claim 25 wherein said information includes a page.

27. A system as claimed in claim 25 wherein said transmitter in said messaging platform includes an FSK transmitter for transmitting said information in an FSK format to said CPE and wherein said receiver in said CPE includes an FSK receiver for receiving said information in an FSK format.

28. A system as claimed in claim 27 wherein said information is provided to said CPE in accordance with an ADSI protocol extension.

29. A system as claimed in claim 25 wherein said transmitter at said CPE includes a DTMF transmitter and said receiver at said messaging platform includes a DTMF receiver, said information request message being transmitted to said messaging platform in DTMF signals.

30. A system as claimed in claim 25 wherein said information includes an e-mail message.

* * * * *

UNITED STATES PATENT AND TRADEMARK OFFICE
CERTIFICATE OF CORRECTION

PATENT NO. : 5,970,125
APPLICATION NO. : 08/933752
DATED : October 19, 1999
INVENTOR(S) : Anthony Hamilton Smith, Jacques Pierre LaPointe and Kevin Peter Morris Page 1 of 1

It is certified that error appears in the above-identified patent and that said Letters Patent is hereby corrected as shown below:

In the Claims

Column 32, Claim 13, line 15 – replace "A system" with "An apparatus".

Column 32, Claim 14, line 27 – replace "A system" with "An apparatus".

Column 32, Claim 15, line 33 – replace "A system" with "An apparatus".

Column 32, Claim 16, line 39 – replace "A system" with "An apparatus".

Column 32, Claim 20, line 54 – replace "A system" with "An apparatus".

Column 32, Claim 22, line 58 – replace "A system" with "An apparatus".

Column 33, Claim 22, line 15 – replace "A apparatus" with "An apparatus".

Signed and Sealed this
Twenty-eighth Day of July, 2015

Michelle K. Lee
*Director of the United States Patent and Trademark Office*